(12) United States Patent
Ueyama et al.

(10) Patent No.: US 11,762,347 B2
(45) Date of Patent: Sep. 19, 2023

(54) CONTROL DEVICE, CONTROL METHOD, AND NON-TRANSITORY COMPUTER-READABLE RECORDING MEDIUM

(71) Applicant: OMRON Corporation, Kyoto (JP)

(72) Inventors: Yuki Ueyama, Kyoto (JP); Yasuaki Abe, Takatsuki (JP); Nobuyuki Sakatani, Otsu (JP); Kazuhiko Imatake, Osaka (JP); Takashi Fujii, Kyoto (JP)

(73) Assignee: OMRON Corporation, Kyoto (JP)

( * ) Notice: Subject to any disclaimer, the term of this patent is extended or adjusted under 35 U.S.C. 154(b) by 508 days.

(21) Appl. No.: 16/968,878

(22) PCT Filed: Mar. 13, 2019

(86) PCT No.: PCT/JP2019/010188
§ 371 (c)(1),
(2) Date: Aug. 11, 2020

(87) PCT Pub. No.: WO2019/188273
PCT Pub. Date: Oct. 3, 2019

(65) Prior Publication Data
US 2021/0011438 A1 Jan. 14, 2021

(30) Foreign Application Priority Data

Mar. 30, 2018 (JP) .................................. 2018-069319

(51) Int. Cl.
*G06F 9/46* (2006.01)
*G05B 13/04* (2006.01)
(Continued)

(52) U.S. Cl.
CPC ......... *G05B 13/048* (2013.01); *G05B 13/041* (2013.01); *G05B 13/047* (2013.01);
(Continued)

(58) Field of Classification Search
CPC ................................ G06F 9/505; G06Q 50/04
(Continued)

(56) References Cited

U.S. PATENT DOCUMENTS

2011/0191310 A1\* 8/2011 Liao ...................... G06F 16/313
707/723

FOREIGN PATENT DOCUMENTS

| CN | 107632521 | 1/2018 |
| JP | H0695707 | 4/1994 |

(Continued)

OTHER PUBLICATIONS

"Office Action of China Counterpart Application" with English translation thereof, dated Dec. 23, 2021, p. 1-p. 32.

(Continued)

*Primary Examiner* — Bradley A Teets
(74) *Attorney, Agent, or Firm* — JCIPRNET

(57) ABSTRACT

A control device executes a step of starting a computation processing of a prediction model; a step of computing a remaining processing time until the computation processing is completed after starting the computation processing of the prediction model; a step of determining whether the determination of the command value based on an output obtained from the prediction model is made within a control timing for controlling the operation of manufacturing by the manufacturing device, on the basis of a computed remaining processing time; and a step of stopping, when it is determined that the determination of the command value is not made within the control timing, the computation processing of the prediction model, determining the command value on the basis of a value of an intermediate result of the computation processing, and controlling the operation of the manufacturing device on the basis of the determined command value.

20 Claims, 14 Drawing Sheets

(51) Int. Cl.
  *G05B 19/418* (2006.01)
  *G06Q 50/04* (2012.01)
  *G06F 9/50* (2006.01)
(52) U.S. Cl.
  CPC ........... *G05B 19/418* (2013.01); *G06F 9/505* (2013.01); *G06Q 50/04* (2013.01)
(58) Field of Classification Search
  USPC ........................................................ 718/104
  See application file for complete search history.

(56) References Cited

FOREIGN PATENT DOCUMENTS

| JP | H0954611 | 2/1997 |
| JP | 2001175735 | 6/2001 |
| JP | 2002278603 | 9/2002 |
| JP | 2011100338 | 5/2011 |
| JP | 2016192010 | 11/2016 |

OTHER PUBLICATIONS

George Hassapis et al., "Implementation of model predictive control using real-time multiprocessing computing," Microprocessors and Microsystems, vol. 27, Aug. 2003, pp. 327-340.
"Search Report of Europe Counterpart Application", dated Nov. 23, 2021, p. 1-p. 9.
"International Search Report (Form PCT/ISA/210)" of PCT/JP2019/010188, dated Jun. 18, 2019, with English translation thereof, pp. 1-4.
"Written Opinion of the International Searching Authority (Form PCT/ISA/237)" of PCT/JP2019/010188, dated Jun. 18, 2019, with English translation thereof, pp. 1-8.

\* cited by examiner

US 11,762,347 B2

CONTROL DEVICE, CONTROL METHOD, AND NON-TRANSITORY COMPUTER-READABLE RECORDING MEDIUM

CROSS-REFERENCE TO RELATED APPLICATION

This application is a 371 application of the International PCT application serial no. PCT/JP2019/010188, filed on Mar. 13, 2019, which claims the priority benefits of Japan Patent Application No. 2018-069319, filed on Mar. 30, 2018. The entirety of the above-mentioned patent application is hereby incorporated by reference herein and made a part of this specification.

BACKGROUND

Technical Field

The present invention relates to a control device, a control method, and a control program.

Related Art

In recent years, in various devices, techniques of prediction control for predicting future states and controlling operations suitable for the predicted future states have been developed. For example, a control device that controls the operation of a vehicle is put forth in Patent Literature 1. The control device includes a first computation unit that controls traveling of the vehicle by speculative execution, and a second computation unit that controls the operation of the vehicle to be able to ensure the safety even if an unpredictable situation occurs in the speculative execution. Specifically, the first computation unit predicts a future input value and controls the operation of the vehicle to perform optimal traveling. On the other hand, the second computation unit controls the operation of the vehicle so that the vehicle travels at a speed equal to a target speed, and the brake is suddenly applied when a distance between the host vehicle and a pedestrian becomes equal to or less than a certain value. The control device controls the operation of the vehicle by using the computation result of the first computation unit when the control of the first computation unit satisfies a certain safety standard, and controls the operation of the vehicle by using the computation result of the second computation unit when the control of the first computation unit does not satisfy the certain safety standard. Thus, according to Patent Literature 1, it is possible to control the operation of the vehicle to ensure a certain safety and perform optimum traveling.

LITERATURE OF RELATED ART

Patent Literature

[Patent Literature 1]
Japanese Patent Laid-Open No. 2016-192010

SUMMARY

Problems to be Solved

The inventors of the present invention have found that, in the case of predicting and controlling the operation of a manufacturing device that manufactures a product from a workpiece in a relatively short cycle, the following problem may occur. That is, in such a manufacturing device, the timing of processing the workpiece arrives in a relatively short cycle. Therefore, if the computation processing of the prediction control is delayed due to the fact that the computation processing of the prediction control is complicated, a computation resource (for example, a processor or the like) is preferentially allocated to other processing, and the like, the computation processing of the prediction control may not be completed until the timing of processing the workpiece. The present inventors have found that there is a problem that the prediction control of the manufacturing device cannot be appropriately performed, unless the computation processing of the prediction control is completed until the timing of processing the workpiece.

In an aspect, the present invention has been made in view of the above circumstances, and an objective thereof is to provide a technique for appropriately performing the prediction control of a manufacturing device.

Means to Solve Problems

The present invention adopts the following configurations to solve the aforementioned problems.

That is, according to an aspect of the present invention, the control device includes a hardware processor, and a memory which holds a program executed by the hardware processor. The hardware processor executes, on the basis of a series of instructions included in the program, a step of starting a computation processing of a prediction model established to predict a command value to a manufacturing device which manufactures a product from a workpiece, the command value being adapted to manufacturing of the product by the manufacturing device; a step of computing a remaining processing time until the computation processing of the prediction model is completed after starting the computation processing of the prediction model; a step of determining whether determination of the command value based on an output value obtained from the prediction model is made within a control timing for controlling the operation of the manufacturing by the manufacturing device, on the basis of the computed remaining processing time; a step of acquiring, when it is determined that the determination of the command value is made within the control timing, by continuing the computation processing of the prediction model until completion, an output value from the prediction model as a final result of the computation processing, determining a command value to the manufacturing device on the basis of the output value obtained from the prediction model, and controlling the operation of the manufacturing device on the basis of the determined command value; and a step of stopping, when it is determined that the determination of the command value is not made within the control timing, the computation processing of the prediction model, determining the command value to the manufacturing device on the basis of a value of an intermediate result of the computation processing, and controlling the operation of the manufacturing device on the basis of the determined command value.

The control device according to the configuration executes, when predicting the command value to the manufacturing device using the prediction model, the step of computing the remaining processing time, and the step of determining whether the determination of the command value by the prediction model is made within the control timing, on the basis of the remaining processing time. Therefore, the control device according to the configuration can check whether the computation processing related to the prediction of the command value using the prediction model is made within timing for controlling the operation of the manufacturing device, using the predicted command value.

Then, when it is determined that determination of the command value by the prediction model is made within the control timing, the control device according to the configuration continues the computation processing of the prediction model until completion, and can execute the prediction control by the prediction model. On the other hand, when it is determined that the determination of the command value by the prediction model is not made within the control timing, the control device according to the configuration stops the computation processing of the prediction model, determines the command value on the basis of the value of the intermediate result of the computation processing, and controls the operation of the manufacturing device on the basis of the determined command value. As a result, it is possible to prevent the process for controlling the operation of the manufacturing device from being delayed, due to the fact that the determination of the command value by the prediction model is not made within the control timing. Therefore, according to the aforementioned configuration, the prediction control of the manufacturing device can be performed appropriately.

The "manufacturing device" is not particularly limited as long as it is a device that performs some kinds of manufacturing process and can be subject to control, and may be, for example, a press machine, an injection molding machine, a NC lathe, an electric discharge machine, a packaging machine, a carrier, a carrier mechanism in an inspection machine, or the like. The "workpiece" is not particularly limited as long as it is an article that can be a working target of the manufacturing device, and may be, for example, a raw material of a product, an article before processing, a part before assembling, or the like. The "product" is an article obtained by performing a manufacturing process on the workpiece by the manufacturing device, and may include an intermediate product (processed product) in addition to the final product. The "prediction model" is not particularly limited as long as it is a model capable of predicting the command value to the manufacturing device at a time point (a future time point) prior to a time point at which the prediction process is executed, and may be appropriately selected according to the embodiment. The "prediction model" is not particularly limited as long as it is a model capable of outputting the value of the intermediate result of the computation processing. A learning model such as a decision tree may be used as the "prediction model".

In the control device according to the aforementioned one aspect, the prediction model may be made up of a decision tree, the decision tree may include a root node, a leaf node, and an intermediate node disposed between the root node and the leaf node, the computation processing of the prediction model may be a search processing which follows a link from the root node of the decision tree toward a leaf node, the leaf node may be associated with a first value, and when the search processing of the decision tree is completed, the hardware processor may acquire the first value associated with the leaf node reached in the search processing, as the output value. When the search processing of the decision tree is stopped, the hardware processor may acquire a second value determined on the basis of the first value associated with the leaf node belonging to the intermediate node reached at the time of stopping the search processing, as the value of the intermediate result. With this configuration, even when the computation processing of the prediction model is stopped, the value of the intermediate result of the computation processing can be appropriately acquired from the decision tree. Therefore, even if the computation processing of the prediction model is not completed, the operation of the manufacturing device can be controlled on the basis of the command value relatively adapted to manufacturing of the product.

In the control device according to the aforementioned one aspect, the second value may be an average value of the first values associated with all leaf nodes belonging to an intermediate node reached at the time of stopping the search processing. With this configuration, even if the computation processing of the prediction model is not completed, the operation of the manufacturing device can be controlled on the basis of the command value that is relatively adapted to manufacturing of the product.

In the control device according to the aforementioned one aspect, the second value may be associated with the intermediate node, and when the search processing of the decision tree is stopped, the hardware processor may acquire the second value associated with the intermediate node reached at the time of stopping the search processing, as the value of the intermediate result. With this configuration, when the computation processing of the prediction model is stopped, it is possible to suppress the computation cost of acquiring the value of the intermediate result of the computation processing.

In the control device according to the aforementioned one aspect, when the computation processing of the prediction model is stopped, the hardware processor may acquire reliability indicating a degree of whether the value of the intermediate result is reliable as a result of prediction, the hardware processor may determine whether the acquired reliability exceeds a designated threshold value, when it is determined that the reliability exceeds the threshold value, the hardware processor may determine a command value to the manufacturing device on the basis of the value of the intermediate result, and may control the operation of the manufacturing device on the basis of the determined command value. When it is determined that the reliability does not exceed the threshold value, the hardware processor may omit the processing of determining the command value to the manufacturing device on the basis of the value of the intermediate result, may designate a set value given in advance as the command value, and may control the operation of the manufacturing device on the basis of the designated command value. With this configuration, even when the computation processing of the prediction model is not completed, the operation of the manufacturing device can be controlled on the basis of the command value adapted to manufacturing of the product. In addition, the set value given in advance is, for example, a reference value of the command value or a past command value (for example, a previous value when the repetitive operation is controlled). The past command value may be, for example, a previous value under the same control situation.

In the control device according to the aforementioned one aspect, the reliability may be determined on the basis of progress of the computation processing. With this configuration, the reliability of the value of the intermediate result can be appropriately evaluated. Therefore, even when the computation processing of the prediction model is not completed, the operation of the manufacturing device can be controlled on the basis of the command value adapted to manufacturing of the product. In addition, when the prediction model is made up of a decision tree, the progress of the computation processing is specified by, for example, the depth of the tree reached by the search processing.

In the control device according to the aforementioned one aspect, when it is determined that the determination of the command value is not made within the control timing, the hardware processor may further execute a step of accelerating the computation processing of the prediction model, after executing the step of accelerating the computation processing of the prediction model, the hardware processor may execute a step of computing the remaining processing time, and a step of determining whether the determination of the command value is made within the control timing again. When it is determined again that the determination of the command value is not made within the control timing, the hardware processor may stop the computation processing of the prediction model, and may determine the command value to the manufacturing device on the basis of the value of the intermediate result of the computation processing. With this configuration, by accelerating the computation processing of the prediction model, the determination of the command value can be made within the control timing. As a result, it is possible to reduce the possibility that the prediction control is aborted and to appropriately perform the prediction control. Further, the acceleration of the computation processing can be realized by giving priority to the allocation of the hardware resource for the computation processing.

In the control device according to the aforementioned one aspect, the hardware processor may determine whether the acceleration of the computation processing of the prediction model is possible, when it is determined that the acceleration of the computation processing of the prediction model is not possible, the hardware processor may stop the computation processing of the prediction model, and may determine the command value to the manufacturing device on the basis of the value of the intermediate result of the computation processing. With this configuration, when there is no room for accelerating the computation processing of the prediction model, and when it is determined that the determination of the command value by the prediction model is not made within the control timing, the command value is determined on the basis of the value of the intermediate result. Accordingly, the prediction control of the manufacturing device can be appropriately performed. The condition for determining whether the computation processing of the prediction model can be accelerated may be appropriately set according to the embodiment. A case where the computation processing of the prediction model cannot be accelerated is, for example, a case where there is no room for preferentially allocating hardware resources to the computation processing.

In the control device according to the aforementioned one aspect, the hardware processor may include one or a plurality of cores, at least one core may be allocated to the computation processing of the prediction model, and the hardware processor may accelerate the computation processing of the prediction model by increasing a utilization rate of the allocated core with respect to the computation processing of the prediction model. With this configuration, the computation processing of the prediction model can be appropriately accelerated, and the prediction control can be appropriately performed accordingly.

In the control device according to the aforementioned one aspect, the hardware processor may include one or a plurality of cores, at least one core may be allocated to the computation processing of the prediction model, the hardware processor may accelerate the computation processing of the prediction model, by increasing a priority of the computation processing of the prediction model in the allocated core. With this configuration, the computation processing of the prediction model can be appropriately accelerated, and the prediction control can be appropriately performed accordingly.

In the control device according to the aforementioned one aspect, the hardware processor may include a plurality of cores, a first core among the plurality of cores may be allocated to the computation processing of the prediction model, and the hardware processor may further allocate a second core among the plurality of cores, which is not allocated to the computation processing of the prediction model, to the computation processing of the prediction model to thereby accelerate the computation processing of the prediction model. With this configuration, the computation processing of the prediction model can be appropriately accelerated, and the prediction control can be appropriately performed accordingly. The number of the first core and the number of the second core may be one or plurality.

In the control device according to the aforementioned one aspect, the hardware processor may include a plurality of cores, a third core among the plurality of cores may be allocated to the computation processing of the prediction model, the plurality of cores may include a fourth core which is not allocated to the computation processing of the prediction model and which has a free space larger than the utilization rate allocated to the computation processing in the third core, and the hardware processor may replace the allocation of the prediction model for the computation processing with the fourth core from the third core, and may allocate a utilization rate, which is larger than the utilization rate allocated to the computation processing in the third core, to the computation processing in the fourth core, thereby accelerating the computation processing of the prediction model. With this configuration, the computation processing of the prediction model can be appropriately accelerated, and the prediction control can be appropriately performed accordingly. The number of the third core and the fourth core may each be one or plurality.

In the control device according to the aforementioned one aspect, the prediction model may be configured to output a correction value for a reference value of the command value, as the output value corresponding to a result of prediction of the command value adapted to manufacturing of the product. With this configuration, it is possible to appropriately determine the command value to the manufacturing device, using the correction value obtained from the prediction model.

In the control device according to the one aspect, the prediction model may be established to predict the command value adapted to manufacturing of the product with respect to the input of at least one of a feature amount of the workpiece and an attribute value of environment for manufacturing the product. With this configuration, it is possible to determine the command value to the manufacturing device in consideration of factors that may affect the manufacturing process of the product by the manufacturing device.

The "work feature amount" is not particularly limited as long as it can show some feature of the workpiece, and may be appropriately selected according to the embodiment. The feature amount of the workpiece is, for example, hardness, size, material, weight, heat or the like. Further, the feature amount of the workpiece may directly show the feature of the workpiece or may indirectly show the feature of the workpiece. The feature amount which directly shows the feature of the workpiece is, for example, one which expresses the hardness (rigidity) itself of the workpiece 40 by a numerical value, a class, or the like. On the other hand, the feature amount which indirectly shows the feature of the workpiece 40 is one which expresses a secondary index (e.g., the load applied to the workpiece, torque made to act at the time of measurement, etc.) obtained when measuring the hardness (rigidity) of the workpiece 40, by a numerical value, class, or the like.

Further, the "attribute value of environment for manufacturing the product" is not particularly limited as long as it can show some attributes related to the environment in which the manufacturing device operates, and may be appropriately selected according to the embodiment. The attribute value of the environment for manufacturing the product may be, for example, the temperature, the humidity, the degree of deterioration of the device (for example, the number of years, the number of times of processing, etc.), vibration or the like around the manufacturing device.

Another aspect of the control device according to each of the above each aspect may be an information processing method that realizes each of the above configurations, a program, or a storage medium readable by a computer, other device, machine, or the like which stores such a program. Here, a computer-readable storage medium is a medium that stores information such as programs by electric, magnetic, optical, mechanical or chemical action.

For example, the control method according to one aspect of the present invention is an information processing method in which a computer executes: a step of starting a computation processing of a prediction model established to predict a command value to a manufacturing device which manufactures a product from a workpiece, the command value being adapted to manufacturing of the product by the manufacturing device; a step of computing a remaining processing time, until the computation processing of the prediction model is completed after starting the computation processing of the prediction model; a step of determining whether determination of the command value based on an output value obtained from the prediction model is made within a control timing for controlling the operation of the manufacturing by the manufacturing device, on the basis of the computed remaining processing time; a step of acquiring, when it is determined that the determination of the command value is made within the control timing, by continuing the computation processing of the prediction model until completion, an output value from the prediction model as a final result of the computation processing, determining a command value to the manufacturing device on the basis of the output value acquired from the model, and controlling the operation of the manufacturing device on the basis of the determined command value; and a step of stopping, when it is determined that the determination of the command value is not made within the control timing, the computation processing of the prediction model, determining the command value to the manufacturing device on the basis of a value of an intermediate result of the computation processing, and controlling the operation of the manufacturing device on the basis of the determined command value.

Further, for example, the control program according to one aspect of the present invention is a program which causes a computer to execute: a step of starting a computation processing of a prediction model established to predict a command value to a manufacturing device which manufactures a product from a workpiece, the command value being adapted to manufacturing of the product by the manufacturing device; a step of computing a remaining processing time until the computation processing of the prediction model is completed after starting the computation processing of the prediction model; a step of determining whether determination of the command value based on an output value obtained from the prediction model is made within a control timing for controlling the operation of the manufacturing by the manufacturing device, on the basis of the computed remaining processing time; a step of acquiring, when it is determined that the determination of the command value is made within the control timing, by continuing the computation processing of the prediction model until completion, an output value from the prediction model as a final result of the computation processing, determining a command value to the manufacturing device on the basis of the output value acquired from the model, and controlling the operation of the manufacturing device on the basis of the determined command value; and a step of stopping, when it is determined that the determination of the command value is not made within the control timing, the computation processing of the prediction model, determining the command value to the manufacturing device on the basis of a value of an intermediate result of the computation processing, and controlling the operation of the manufacturing device on the basis of the determined command value.

Effect

According to the present invention, the prediction control of the manufacturing device can be appropriately performed.

DESCRIPTION OF THE EMBODIMENTS

Hereinafter, an embodiment according to an aspect of the present invention (hereinafter, also referred to as "the present embodiment") will be described on the basis of the drawings. However, the present embodiment described below is merely an example of the present invention in all respects. It goes without saying that various improvements and modifications can be made without departing from the scope of the present invention. That is, a specific configuration according to the embodiment may be appropriately adopted in implementing the present invention. Although the data that appears in this embodiment is described in natural language, more specifically, it is designated by a computer-recognizable pseudo language, command, parameter, machine language, or the like.

§ 1 Application example

Figure 1:
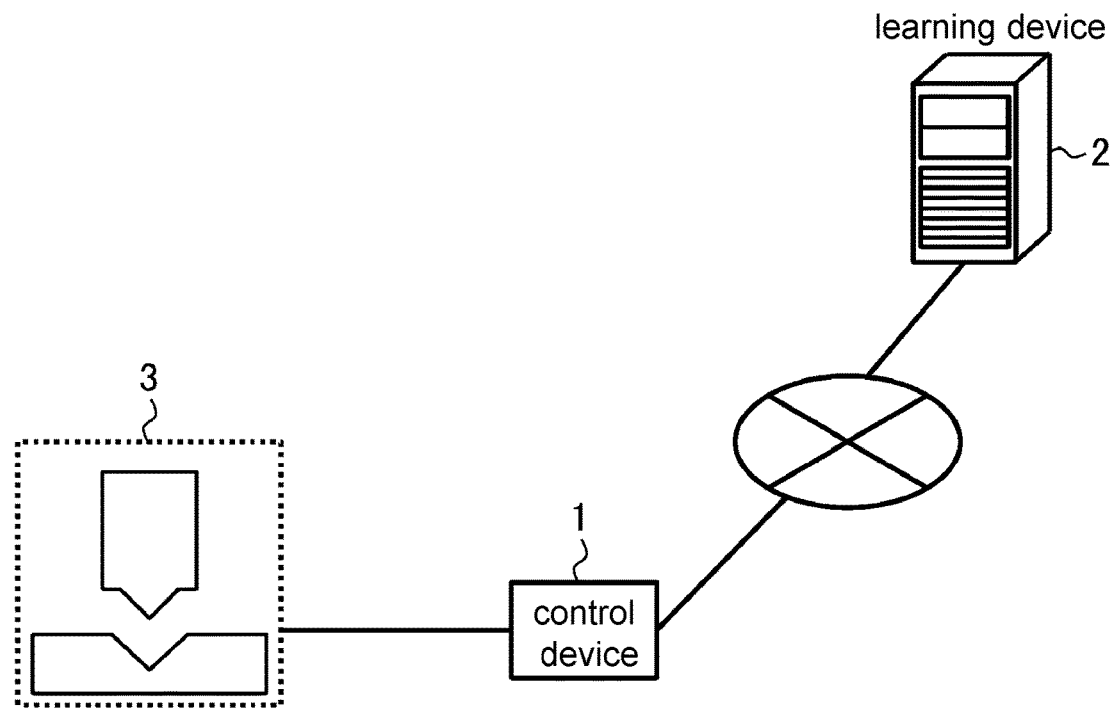
FIG. 1 schematically illustrates an example of a scene to which the present invention is applied.

First, an example of a scene to which the present invention is applied will be described using FIG. 1. FIG. 1 schematically illustrates an example of a usage scene of a control device 1 and a learning device 2 according to the present embodiment.

As shown in FIG. 1, the control device 1 according to the present embodiment is an information processing device configured to control the operation of a manufacturing device 3. In the example of FIG. 1, the manufacturing device 3 is a press machine that processes a workpiece. This press machine is an example of the "manufacturing device" in the present invention. However, the manufacturing device to which the control device 1 can be applied is not limited to such a press machine, and may be appropriately selected according to the embodiment. The manufacturing device 3 may be, for example, an injection molding machine, an NC lathe, an electric discharge machine, a packaging machine, a carrier machine, a carrier mechanism in an inspection machine, or the like, in addition to a press machine.

Specifically, first, the control device 1 according to the present embodiment starts a computation processing of a prediction model (a prediction model 5 to be described below) established to predict a command value to a manufacturing device 3 that manufactures a product from a workpiece, and the command value is adapted to manufacturing of a product by the manufacturing device 3. After starting the computation processing of the prediction model, the control device 1 computes a remaining processing time until the computation processing of the prediction model is completed. The control device 1 computes a remaining processing amount of the computation processing, for example, by checking a progress state of the computation processing, and computes the remaining processing time on the basis of the computed remaining processing amount. The remaining processing time may change, depending on the situation of the computation resources in the control device 1. Next, the control device 1 determines, on the basis of computed remaining processing time, whether the determination of the command value based on an output value obtained from the prediction model is made within a control timing for controlling the manufacturing operation by the manufacturing device 3. Therefore, the control device 1 can check whether the computation processing related to the prediction of the command value using the prediction model is made within timing for controlling the operation of the manufacturing device 3 using the predicted command value.

When it is determined that the determination of the command value is made within the control timing, the control device 1 continues the computation processing of the prediction model until completion to acquire the output value from the prediction model, and determines a command value to the manufacturing device 3 on the basis of the output value obtained from the prediction model. Further, the control device 1 controls the operation of the manufacturing device 3 on the basis of the determined command value. On the other hand, when it is determined that the determination of the command value is not made within the control timing, the control device 1 stops the computation processing of the prediction model 5, and determines the command value to the manufacturing device 3 on the basis of the value of the intermediate result of the computation processing. Further, the control device 1 controls the operation of the manufacturing device 3 on the basis of the determined command value.

In contrast, the learning device 2 according to the present embodiment is an information processing device configured to construct a prediction model used by the control device 1. In the present embodiment, the prediction model is made up of a learning model (a decision tree to be described below). Therefore, the learning device 2 establishes a prediction model which acquires the ability to predict a command value adapted to manufacturing of a product by the manufacturing device 3, by acquiring learning data (learning data set 221 to be described below) used for the machine learning, and performing the machine learning using the acquired learning data. The control device 1 can acquire the learned prediction model created by the learning device 2, for example, via a network. The type of network may be appropriately selected from Internet, a wireless communication network, a mobile communication network, a telephone network, a dedicated network, and the like.

As mentioned above, in the present embodiment, when predicting the command value to the manufacturing device 3 using the prediction model, a step of computing the remaining processing time, and a step of determining whether determination of the command value by the prediction model is made within the control timing on the basis of the remaining processing time. Therefore, it is possible to check whether the computation processing related to the prediction of the command value using the prediction model is made within timing for controlling the operation of the manufacturing device 3 using the predicted command value.

In particular, in the control device 1, a plurality of tasks including tasks other than the computation processing of the prediction model can be processed. In this case, for example, due to the occurrence of interruption tasks, or the like, the computation resources in the control device 1 may not always be available under the same conditions. That is, the situation of the computation resources in the control device 1 changes from moment to moment, and the computation resources that can be used for the computation processing of the prediction model may also change accordingly. Therefore, the processing time required for the computation processing of the prediction model is not always constant.

Therefore, even if the prediction model determined to be processable in time for the control timing is installed in the control device 1, on the basis of the processing time previously specified by simulation or the like, there is a likelihood that the computation processing of the prediction model may not be made within the control timing. In contrast, in the present embodiment, when executing the computation processing of the prediction model, the control device 1 computes the remaining processing time required for the computation processing. As a result, the control device 1 can determine whether the computation processing of the prediction model is made within the control timing, even if the situation of the computation resource changes momentarily. Therefore, according to the present embodiment, the computation time of the prediction control of the manufacturing device 3 can be appropriately managed.

Further, when the control device 1 according to the present embodiment determines that the determination of the command value by the prediction model is made within the control timing, the control device 1 continues the computation processing of the prediction model until completion, and can execute the prediction control by the prediction model. On the other hand, when the control device 1 according to the present embodiment determines that the determination of the command value by the prediction model is not made within the control timing, the control device 1 stops the computation processing of the prediction model, determines a command value on the basis of the value of the intermediate result of the computation processing, and controls the operation of the manufacturing device 3 on the basis of the determined command value. Accordingly, it is possible to prevent the processing for controlling the operation of the manufacturing device 3 from being delayed due to the fact that the determination of the command value by the prediction model is not made within the control timing. Therefore, according to the present embodiment, the prediction control of the manufacturing device 3 can be appropriately performed.

§ 2 Configuration example

[Hardware Configuration]

<Control Device>

Figure 2:
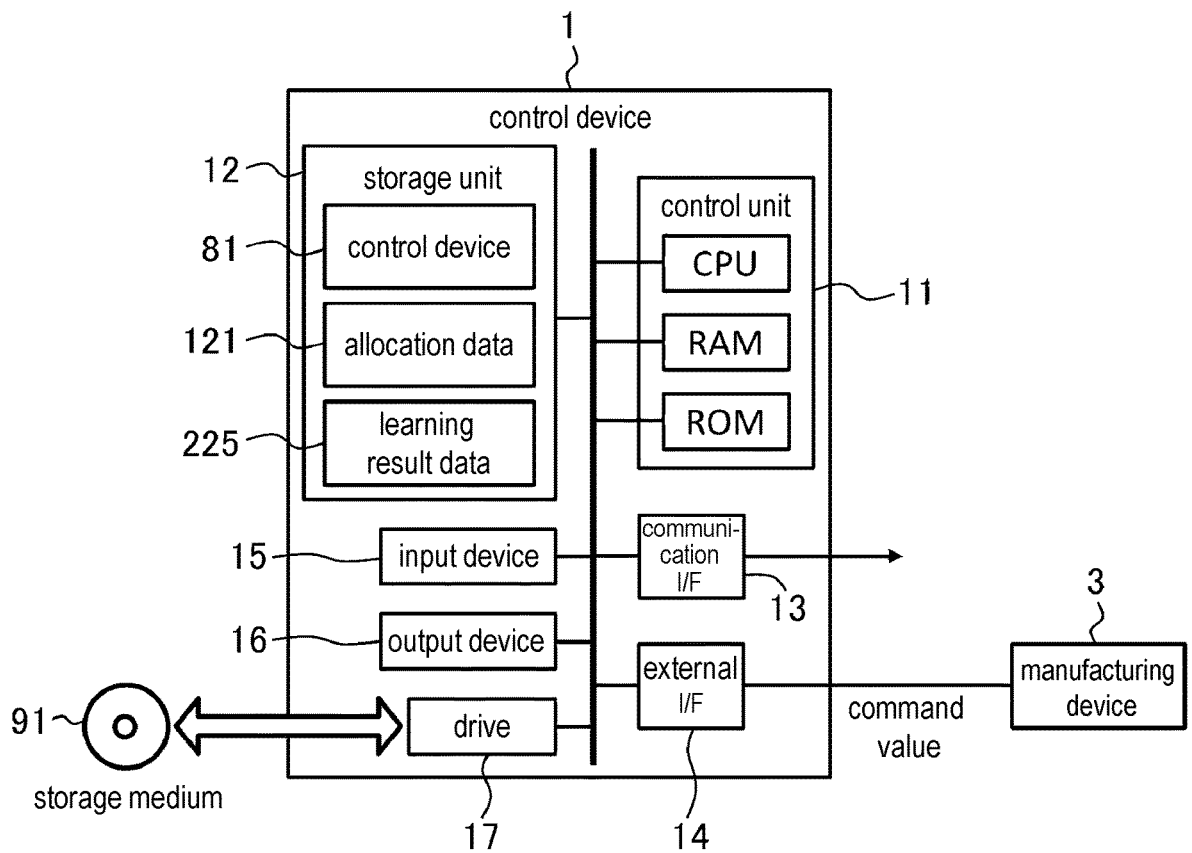
FIG. 2 schematically illustrates an example of the hardware configuration of a control device according to an embodiment.

Next, an example of the hardware configuration of the control device 1 according to the present embodiment will be described using FIG. 2. FIG. 2 schematically illustrates an example of the hardware configuration of the control device 1 according to this embodiment.

As shown in FIG. 2, the control device 1 according to the present embodiment is a computer to which a control unit 11, a storage unit 12, a communication interface 13, an external interface 14, an input device 15, an output device 16, and a drive 17 are electrically connected. In FIG. 2, the communication interface and the external interface are described as a "communication I/F" and an "external I/F", respectively.

The control unit 11 includes a CPU (Central Processing Unit), a RAM (Random Access Memory), a ROM (Read Only Memory) and the like that are hardware processors, and is configured to execute information processing on the basis of a program and various data. The storage unit 12 is an example of a memory, and is made up of, for example, a hard disk drive, a solid-state drive, or the like. In the present embodiment, the storage unit 12 stores various types of information, such as a control program 81 executed by the control unit 11 (CPU), an allocation data 121, a learning result data 225, and the like.

The control program 81 is a program for causing the control device 1 to execute information processing (FIGS. 9A and 9B) to be described below that controls the operation of the manufacturing device 3, and includes a series of instructions for the information processing. The allocation data 121 indicates allocation of tasks to computation resources (for example, a hardware processor, and a memory) in the control device 1. The learning result data 225 is data for setting the learned prediction model. Details thereof will be described below.

The communication interface 13 is, for example, a wired LAN (Local Area Network) module, a wireless LAN module, or the like, and is an interface for performing wired or wireless communication via a network. The control device 1 can perform data communication with another information processing device (for example, the learning device 2) via the network, using this communication interface 13.

The external interface 14 is, for example, a USB (Universal Serial Bus) port, a dedicated port, or the like, and is an interface for connecting to an external device. The type and the number of external interfaces 14 may be appropriately selected, depending on the type and the number of external devices to be connected. In this embodiment, the control device 1 is connected to the manufacturing device 3 via the external interface 14. Accordingly, the control device 1 can control the operation of the manufacturing device 3, by transmitting the command value to the manufacturing device 3.

The input device 15 is, for example, a device for performing an input, such as a mouse or a keyboard. Further, the output device 16 is, for example, a device for performing an output, such as a display or a speaker. An operator can manipulate the control device 1, using the input device 15 and the output device 16.

The drive 17 is, for example, a CD drive, a DVD drive, or the like, and is a drive device for reading a program stored in the storage medium 91. The type of drive 17 may be appropriately selected depending on the type of storage medium 91. At least one of the control program 81 and the learning result data 225 may be stored in this storage medium 91.

The storage medium 91 is a medium that accumulates information such as recorded programs electrically, magnetically, optically, mechanically, or chemically so that a computer or other device, a machine, or the like can read information such as the recorded programs. The control device 1 may acquire at least one of the control program 81 and the learning result data 225 from the storage medium 91.

Here, in FIG. 2, a disk-type storage medium such as a CD or a DVD is illustrated as an example of the storage medium 91. However, the type of the storage medium 91 is not limited to the disc type, and may be types other than the disc type. As the storage medium other than the disk type, for example, a semiconductor memory such as a flash memory can be used.

With regard to the specific hardware configuration of the control device 1, it is possible to omit, replace, and add components as appropriate according to the embodiment. For example, the control unit 11 may include a plurality of hardware processors. The hardware processor may include a microprocessor, an FPGA (field-programmable gate array), a DSP (digital signal processor), or the like. The storage unit 12 may include a RAM and a ROM included in the control unit 11. At least one of the communication interface 13, the external interface 14, the input device 15, the output device 16 and the drive 17 may be omitted. The control device 1 may include a plurality of computers. In this case, the hardware configuration of each computer may or may not match. Further, the control device 1 may be, a general-purpose controller, a general-purpose server device, a general-purpose desktop PC (Personal Computer), a laptop PC, a tablet PC or the like, in addition to an information processing device designed exclusively for the provided service.

<Manufacturing Device>

Figure 3:
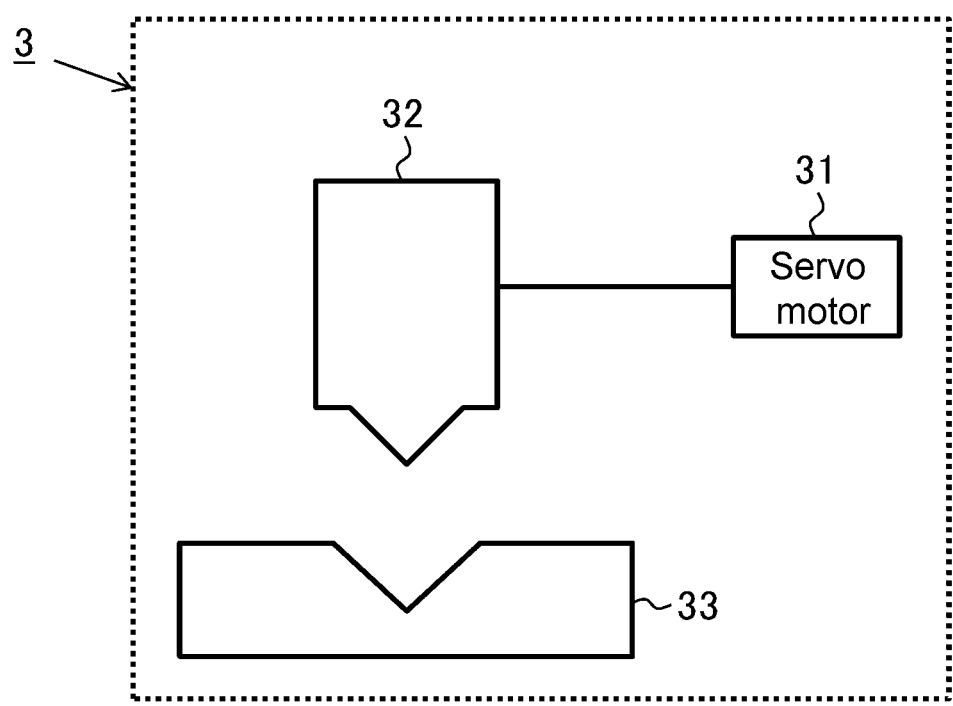
FIG. 3 schematically illustrates an example of a manufacturing device according to an embodiment.

Next, an example of the hardware configuration of the manufacturing device 3 according to the present embodiment will be described using FIG. 3. FIG. 3 schematically illustrates an example of the hardware configuration of the manufacturing device 3 according to this embodiment.

The manufacturing device 3 according to the present embodiment includes a servo driver 31, an upper mold 32, and a lower mold 33. While the lower mold 33 is fixed, the upper mold 32 is configured to be movable in a vertical direction by a servomotor (not shown). As a result, the upper mold 32 can press the workpiece against the lower mold 33 to mold the workpiece or can separate from the lower mold 33. The servo driver 31 is configured to drive the servo motor of the upper mold 32, on the basis of command value from the control device 1.

Figure 4A:
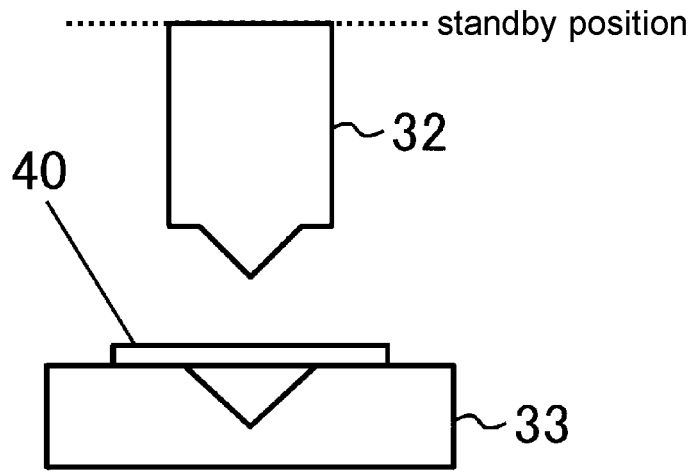
FIG. 4A schematically illustrates an example of a manufacturing process in the manufacturing device of FIG. 3.

Next, an example of a manufacturing process in the manufacturing device 3 will be schematically illustrated using FIGS. 4A to 4D. The manufacturing device 3 is disposed, for example, in a manufacturing line. As shown in FIG. 4A, in an initial state, the upper mold 32 is disposed at a standby position separated from the lower mold 33, and stands by until the workpiece 40 is conveyed to the lower mold 33. The workpiece 40 is, for example, a metal plate material. However, the workpiece 40 is not limited to such an example, and may be appropriately selected according to the type of the manufacturing device 3. The workpiece 40 may be, for example, a raw material of a product, an article before processing, a part before assembling, or the like.

Figure 4B:
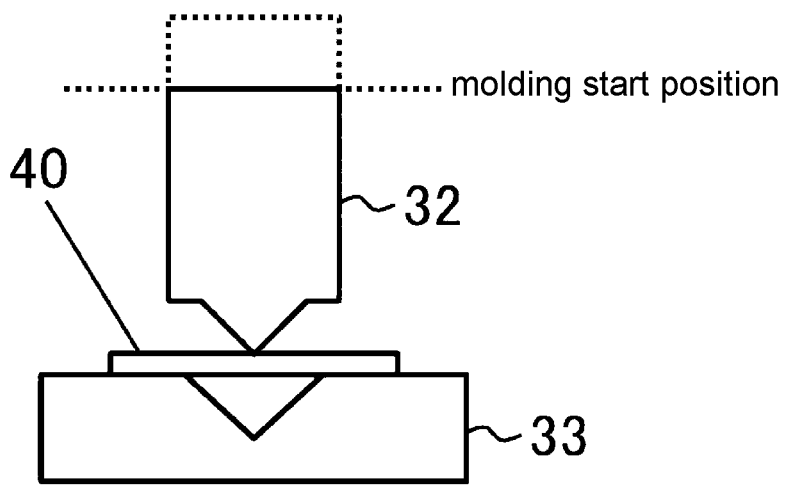
FIG. 4B schematically illustrates an example of a manufacturing process in the manufacturing device of FIG. 3.

After the workpiece 40 is disposed at a predetermined position of the lower mold 33, as shown in FIG. 4B, the manufacturing device 3 drives the servo motor of the upper mold 32 by the servo driver 31, and disposes the upper mold 32 at a molding start position. The molding start position is, for example, a position where a tip of the upper mold 32 comes into contact with the workpiece 40 or immediately before the contact.

Figure 4C:
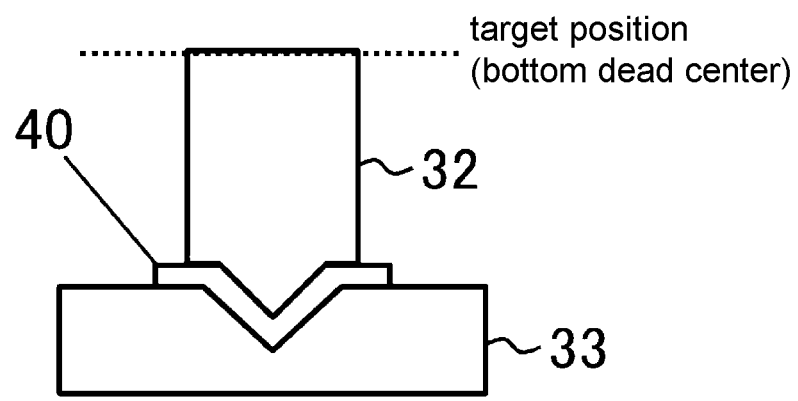
FIG. 4C schematically illustrates an example of a manufacturing process in the manufacturing device of FIG. 3.

Further, as shown in FIG. 4C, the manufacturing device 3 further drives the servo motor of the upper mold 32 by the servo driver 31 to move the upper mold 32 to a target position (a bottom dead center), and mold the workpiece 40 by the upper mold 32 and the lower mold 33. As a result, the manufacturing device 3 can manufacture the product 41 from the workpiece 40. Further, the product 41 is not particularly limited as long as it is acquired by performing a manufacturing process on the workpiece 40 using the manufacturing device 3, and may be a final product or an intermediate product (a product during processing).

Figure 4D:
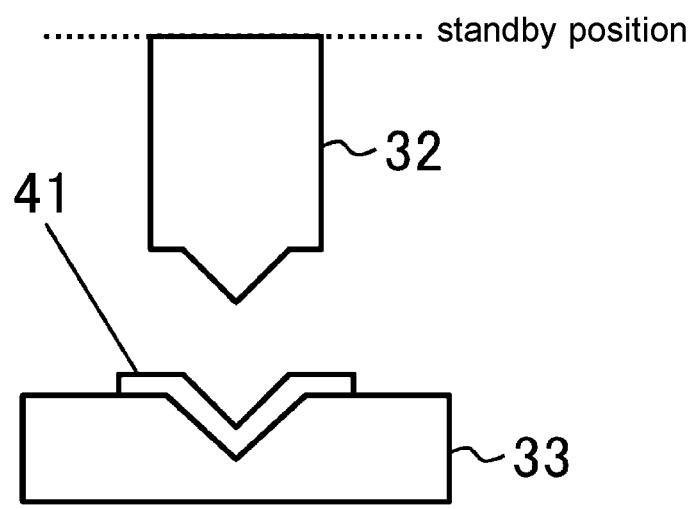
FIG. 4D schematically illustrates an example of a manufacturing process in the manufacturing device of FIG. 3.

After the molding is completed, as shown in FIG. 4D, the manufacturing device 3 drives the servo motor of the upper mold 32 by the servo driver 31 to move the upper mold 32 to the standby position. Further, the product 41 acquired by molding the workpiece 40 is conveyed from the manufacturing device 3 by a belt conveyor (not shown) or the like. As a result, a series of manufacturing processes for manufacturing the product 41 from the workpiece 40 is completed.

In this manufacturing process, if a pressing time in FIG. 4C is insufficient, or if the servo motor is not driven until the upper mold 32 reaches the bottom dead center, the quality of the obtained product 41 is degraded. Therefore, in related art, an on-site worker regularly checks the quality of products and adjusts the operation setting of the manufacturing device to suppress the generation of defective products. In contrast, the control device 1 according to the present embodiment predicts an appropriate command value to the manufacturing device 3 so that a defect does not occur in the manufacturing process, by utilizing the prediction model. As a result, the control device 1 automatically adjusts the operation of the manufacturing device 3 to suppress the generation of defective products.

<Learning device>

Figure 5:
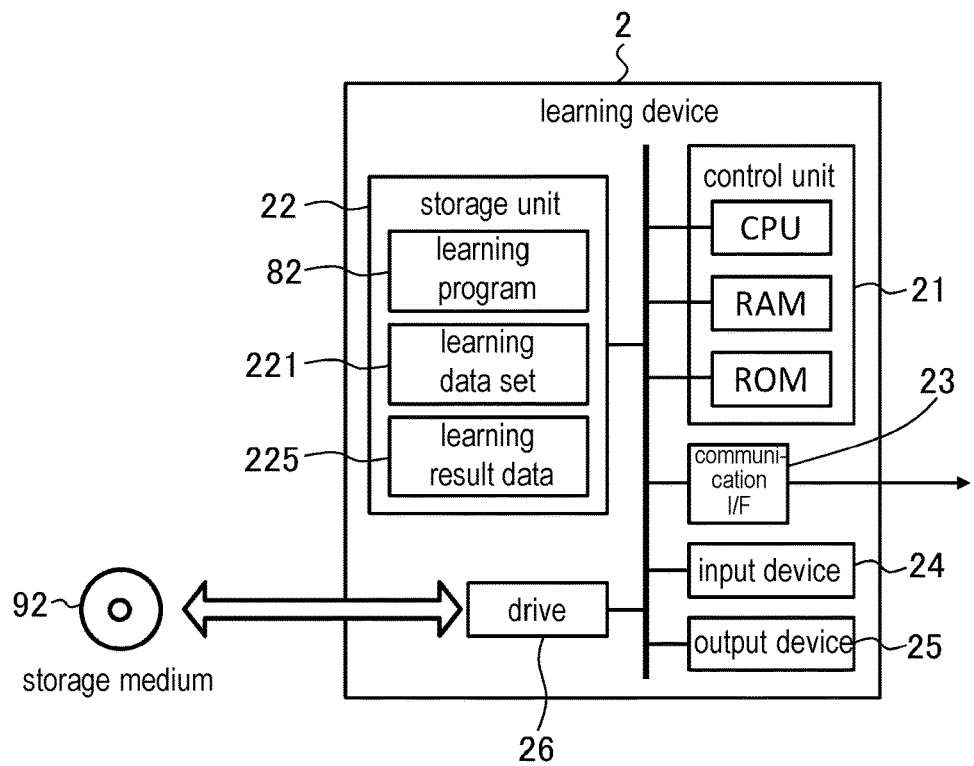
FIG. 5 schematically illustrates an example of the hardware configuration of a learning device according to the embodiment.

Next, an example of the hardware configuration of the learning device 2 according to the present embodiment will be described using FIG. 5. FIG. 5 schematically illustrates an example of the hardware configuration of the learning device 2 according to this embodiment.

As shown in FIG. 5, the learning device 2 according to the present embodiment is a computer to which a control unit 21, a storage unit 22, a communication interface 23, an input device 24, an output device 25, and a drive 26 are electrically connected. In addition, in FIG. 5, the communication interface is described as a "communication I/F".

Like the control unit 11, the control unit 21 includes a CPU, a RAM, a ROM and the like that are hardware processors, and is configured to execute information processing on the basis of a program and various data. The storage unit 22 includes, for example, a hard disk drive, a solid state drive, or the like. The storage unit 22 stores various kinds of information, such as a learning program 82 executed by the control unit 21 (CPU), a learning data set 221 used for machine learning of a prediction model, and learning result data 225 created by executing the learning program 82.

The learning program 82 is a program for causing the learning device 2 to execute information processing (FIG. 14) to be described below of the machine learning of the prediction model, and generating learning result data 225 as a result of the machine learning. The learning program 82 includes a series of instructions for the information processing. The learning data set 221 is a data set used for the machine learning for establishing a prediction model that acquires the ability to predict a command value adapted to manufacturing of a product by the manufacturing device 3. Details thereof will be described below.

The communication interface 23 is, for example, a wired LAN module, a wireless LAN module, or the like, and is an interface for performing wired or wireless communication via a network. The learning device 2 can perform data communication via the network with another information processing device (for example, the control device 1), by utilizing this communication interface 23. Further, the learning device 2 can distribute the created learning result data 225 to an external device, using the communication interface 23.

The input device 24 is, for example, a device for performing the input, such as a mouse or a keyboard. The output device 25 is, for example, a device for performing the output, such as a display or a speaker. The operator can manipulate the learning device 2 via the input device 24 and the output device 25.

The drive 26 is, for example, a CD drive, a DVD drive, or the like, and is a drive device for reading a program stored in the storage medium 92. The type of drive 26 may be appropriately selected depending on the type of storage medium 92. At least one of the learning program 82 and the learning data set 221 may be stored in the storage medium 92.

The storage medium 92 is a medium that accumulates information such as a program in a computer electrically, magnetically, optically, mechanically or chemically, so that the computer, other devices, the machine and the like can read information such as the recorded program. The learning device 2 may acquire at least one of the learning program 82 and the learning data set 221 from the storage medium 92.

Here, in FIG. 5, a disk-type storage medium such as a CD or a DVD is illustrated as an example of the storage medium 92, similar to FIG. 2. However, the type of the storage medium 92 is not limited to the disc type, and may be types other than the disc type. As the storage medium other than the disk type, for example, a semiconductor memory such as a flash memory can be used.

Regarding the specific hardware configuration of the learning device 2, the constituent elements can be omitted, replaced, and added as appropriate according to the embodiment. For example, the control unit 21 may include a plurality of hardware processors. The hardware processor may be configured by a microprocessor, a FPGA, an ECU or the like. The learning device 2 may be configured by a plurality of information processing devices. Further, as the learning device 2, a general-purpose server device, a PC, or the like may be used, in addition to the information processing device designed exclusively for the provided service.

[Software Configuration]
<Control Device>

Figure 6:
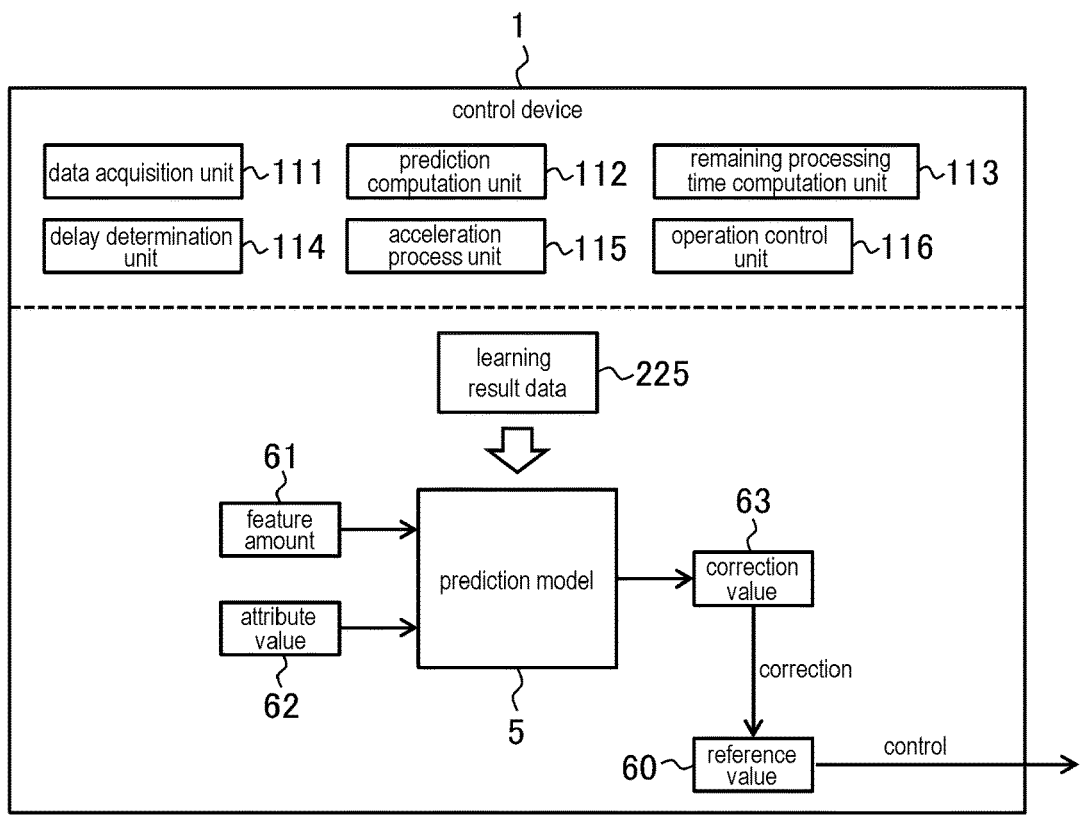
FIG. 6 schematically illustrates an example of the software configuration of the control device according to the embodiment.

Next, an example of the software configuration of the control device 1 according to the present embodiment will be described using FIG. 6. FIG. 6 schematically illustrates an example of the software configuration of the control device 1 according to the present embodiment.

The control unit 11 of the control device 1 deploys the control program 81 stored in the storage unit 12 into the RAM. Further, the control unit 11 interprets and executes the control program 81 deployed in the RAM by the CPU, and controls each component, on the basis of a series of instructions included in the control program 81. Therefore, as shown in FIG. 6, the control device 1 according to the present embodiment operates as a computer that includes a data acquisition unit 111, a prediction computation unit 112, a remaining processing time computation unit 113, a delay determination unit 114, an acceleration processing unit 115, and an operation control unit 116, as a software module. That is, in this embodiment, each software module is realized by the control unit 11 (CPU).

The data acquisition unit 111 acquires data used by the prediction model 5 to predict a command value adapted to manufacturing of the product 41 by the manufacturing device 3. In the present embodiment, the prediction model 5 is established to predict the command value adapted to manufacturing of the product 41, with respect to the input of the feature amount 61 of the workpiece 40 and the attribute value 62 of the environment for manufacturing the product 41. Therefore, the data acquisition unit 111 acquires the feature amount 61 of the workpiece 40 and the attribute value 62 of the environment for manufacturing the product 41.

The prediction computation unit 112 includes a prediction model 5 established to predict a command value to the manufacturing device 3 that manufactures the product 41 from the workpiece 40, the command value being adapted to manufacturing of the product 41 by the manufacturing device 3. In order to perform the prediction control, the prediction computation unit 112 starts the computation processing of the prediction model 5. The remaining processing time computation unit 113 computes the remaining processing time from the start of the computation processing of the prediction model 5 to the completion of the computation processing of the prediction model 5. The delay determination unit 114 determines whether the determination of the command value based on the output value obtained from the prediction model 5 is made within the control timing for controlling the manufacturing operation by the manufacturing device 3, on the basis of the computed remaining processing time.

If it is determined that determination of the command value is made within the control timing, the prediction computation unit 112 continues the computation processing of the prediction model 5 until completion, thereby acquiring the prediction value from the prediction model 5. The operation control unit 116 determines a command value to the manufacturing device 3 on the basis of the output value obtained from the prediction model 5. Further, the operation control unit 116 controls the operation of the manufacturing device 3 on the basis of the determined command value.

In the present embodiment, the prediction model 5 is configured to output a correction value 63 for a reference value 60 of the command value, as the output value corresponding to the result of the prediction of the command value adapted to manufacturing of the product 41. Therefore, the prediction computation unit 112 acquires the output value corresponding to the correction value 63 from the prediction model 5, by completing the computation processing of the prediction model 5. Accordingly, the operation control unit 116 determines the value, which is acquired by correcting the reference value 60 by the acquired correction value 63, as the command value, and controls the operation of the manufacturing device 3 on the basis of the determined command value.

On the other hand, in the present embodiment, when it is determined that determination of the command value is not made within the control timing, the acceleration processing unit 115 accelerates the computation processing of the prediction model 5. The acceleration processing unit 115 accelerates the computation processing of the prediction model 5, for example, by preferentially allocating the computation resources of hardware to the computation processing of the prediction model 5. When it is determined that the computation processing of the prediction model 5 cannot be accelerated and the determination of the command value is not made within the control timing, the prediction computation unit 112 stops the computation processing of the prediction model 5. Further, the operation control unit 116 determines a command value to the manufacturing device 3 on the basis of the value of the intermediate result of the computation processing, and controls the operation of the manufacturing device 3 on the basis of the determined command value.

(Prediction Model)

Figure 7A:
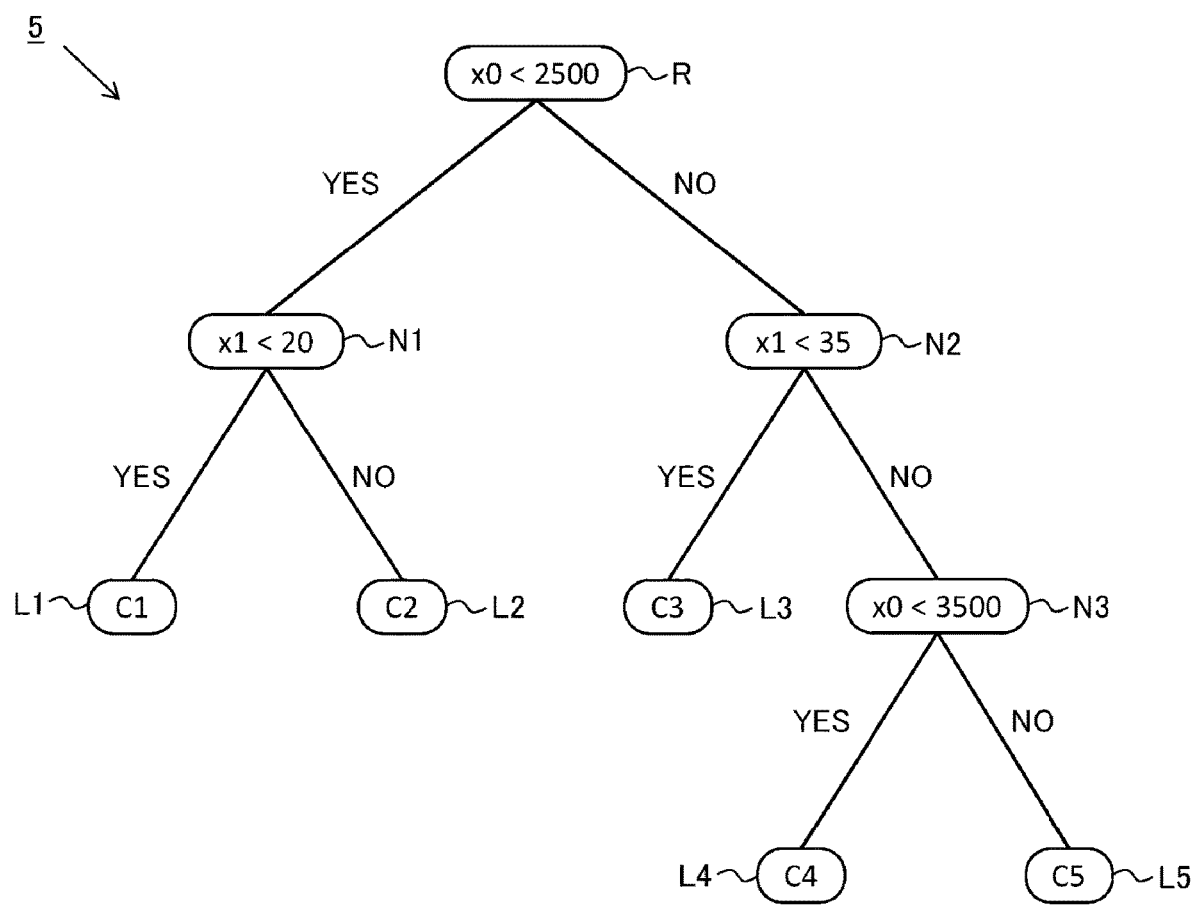
FIG. 7A schematically illustrates an example of a prediction model according to the embodiment.
Figure 7B:
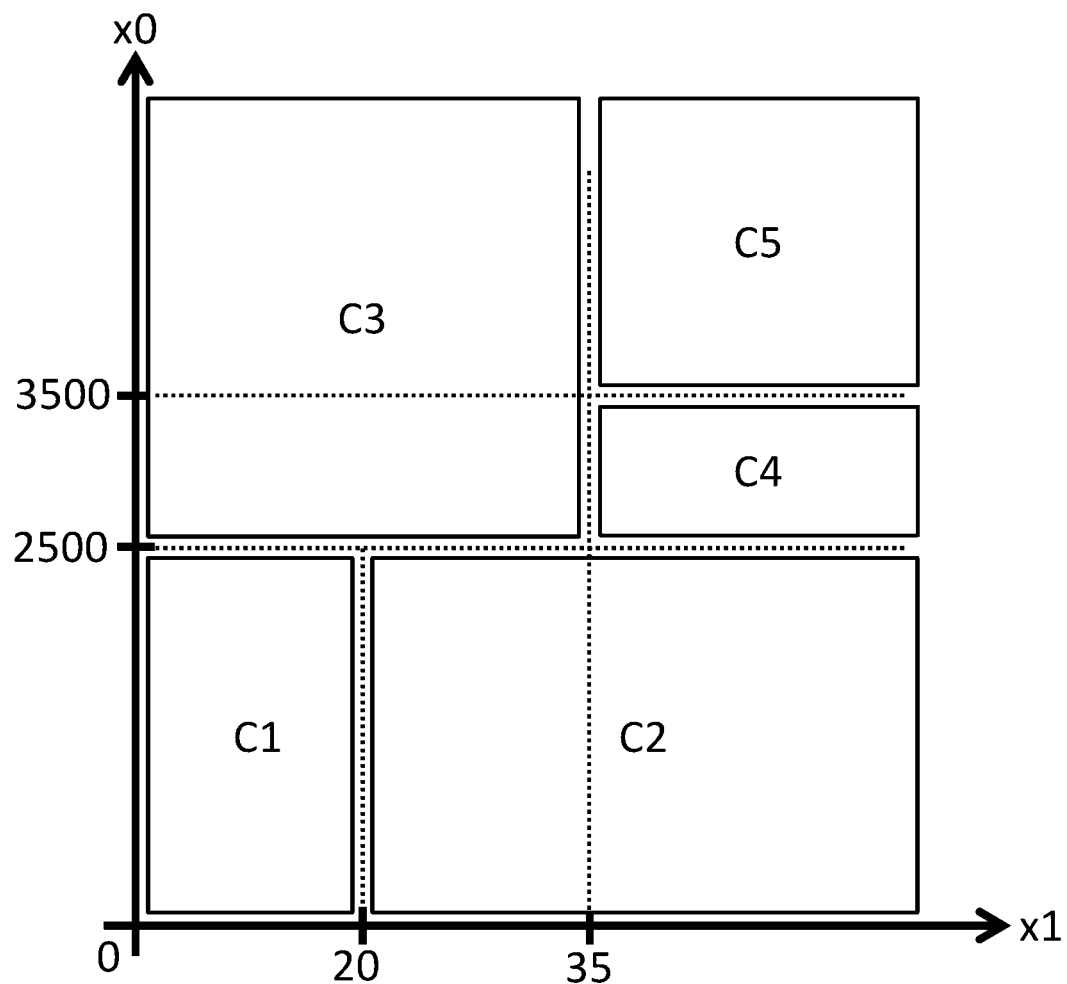
FIG. 7B schematically illustrates a relationship between an input and an output with respect to the prediction model.

Next, a prediction model 5 according to the present embodiment will be described further using FIGS. 7A and 7B. FIG. 7A schematically illustrates an example of the configuration of the prediction model 5 according to this embodiment. Further, FIG. 7B schematically illustrates the relationship between the input and the output with respect to the prediction model 5.

As shown in FIG. 7A, the prediction model 5 according to the present embodiment is made up of a decision tree (specifically, a regression tree). The prediction model 5 (decision tree) includes a root node R, leaf nodes L1 to L5, and intermediate nodes N1 to N3 disposed between the root node R and the leaf nodes L1 to L5. Links are provided between the respective nodes. In the example of FIG. 7A, links are provided between the root node R and the intermediate node (N1, N2), between the intermediate node N1 and each leaf node (L1, L2), between the intermediate node N2, the leaf node L3 and the leaf node N3, and between the leaf node N3 and each leaf node (L4, L5), respectively.

In the example of FIG. 7A, the decision tree has a depth of 4, the number of intermediate nodes is three, and the number of leaf nodes is five. However, the depth of the decision tree, the number of intermediate nodes, and the number of leaf nodes are not limited to such an example, and may be appropriately determined according to the embodiment. Further, in the example of FIG. 7A, no link is provided from the root node R to each of the leaf nodes L1 to L5. However, the configuration of the decision tree is not limited to such an example, and there may be leaf nodes connected to the link from the root node.

The computation processing of the prediction model 5 is a search processing that follows links from the root node R of the decision tree to the leaf nodes L1 to L5. That is, branching conditions are associated with the routes from the root node R to the leaf nodes L1 to L5 (in the example of FIG. 7A, the root node R and the intermediate nodes N1 to N3). In the example of FIG. 7A, the root node R is associated with a branching condition of "x0<2500", the intermediate node N1 is associated with a branching condition of "x1<20", the intermediate node N2 is associated with a branching condition of "x1<35", and the intermediate node N3 is associated with a branching condition of "x0<3500". On the other hand, each leaf node L1 to L5 is associated with a first value corresponding to the final result (classes C1 to C5) of the computation processing of the prediction model 5. In the present embodiment, each leaf node L1 to L5 (classes C1 to C5) is associated with a correction value 63 corresponding to the input feature amount 61 and attribute value 62 as a first value. In the present embodiment, the prediction computation unit 112 starts the search processing from the root node R, and repeats the determination of whether the input data satisfies the branching condition, thereby continuing to explore deeper nodes, until one of the leaf nodes L1 to L5 is reached.

In the example of FIG. 7A, the input x0 corresponds to the feature amount 61, and the input x1 corresponds to the attribute value 62. FIG. 7B illustrates a relationship between each input (x0, x1) and the classes C1 to C5 associated with the arriving leaf nodes L1 to L5. For example, it is assumed that input x0 is 2000 and input x1 is 30. In this case, the prediction computation unit 112 determines whether the input x0 satisfies the branching condition set in the root node R, as the computation processing (search processing) of the first layer of the prediction model 5. In the example of FIG. 7A, since the branching condition set in the root node R is "x0<2500" and the input x0 is 2000, the prediction computation unit 112 determines that the input x0 satisfies the branching condition set in the root node R, and advances the search to the intermediate node N1 of the next layer.

Next, the prediction computation unit 112 determines whether the input x1 satisfies the branching condition set in the intermediate node N1, as the computation processing of the second layer of the prediction model 5. In the example of FIG. 7A, since the branching condition set in the intermediate node N1 is "x1<20" and the input x1 is 30, the prediction computation unit 112 determines that the input x1 does not satisfy the branching condition set in the intermediate node N1, and advances to the leaf node L2 of the next layer. As a result, since the search for the decision tree reaches the leaf node L2, the computation processing (search processing for the decision tree) of the prediction model 5 is completed.

When the search processing of the decision tree is completed in this way, the prediction computation unit 112 can acquire the correction value 63 associated with the class of the leaf node reached in the search processing, as the first value (in other words, the output value of the prediction model 5) corresponding to the final result of the computation processing of the prediction model 5. In the aforementioned example, the prediction computation unit 112 acquires the correction value 63 associated with the class C2 of the leaf node L2, as the output value of the prediction model 5.

The method for acquiring the correction value 63 associated with each of the classes C1 to C5 may be appropriately determined according to the embodiment. For example, the correction values may be directly associated with the respective classes C1 to C5. Further, for example, the control device 1 may store reference information, such as a table format indicating the correspondence between each class C1 to C5 and the correction value, in a storage unit 12. This reference information may be included in the learning result data 225. In this case, after reaching any leaf node, by collating the class of the reached leaf node with the reference information, the prediction computation unit 112 can acquire the correction value 63 for the reference value 60 of the command value, as the first value corresponding to the final result of the computation processing of the prediction model 5.

On the other hand, when the search processing of the decision tree is stopped, the prediction computation unit 112 acquires the second value determined on the basis of the first value associated with the leaf node belonging to the intermediate node reached when stopping the search processing, as the value of the intermediate result. In the present embodiment, the prediction computation unit 112 acquires the correction value determined on the basis of the correction value 63 associated with the leaf node belonging to the intermediate node reached when stopping the search processing, as the second value.

The learning result data 225 includes information indicating the configuration of the prediction model 5 (decision tree) and each branching condition. The prediction computation unit 112 can set the learned prediction model 5 to be used in the processing of predicting the command value adapted to manufacturing of the product 41, by referring to the learning result data 225.

<Learning Device>

Figure 8:
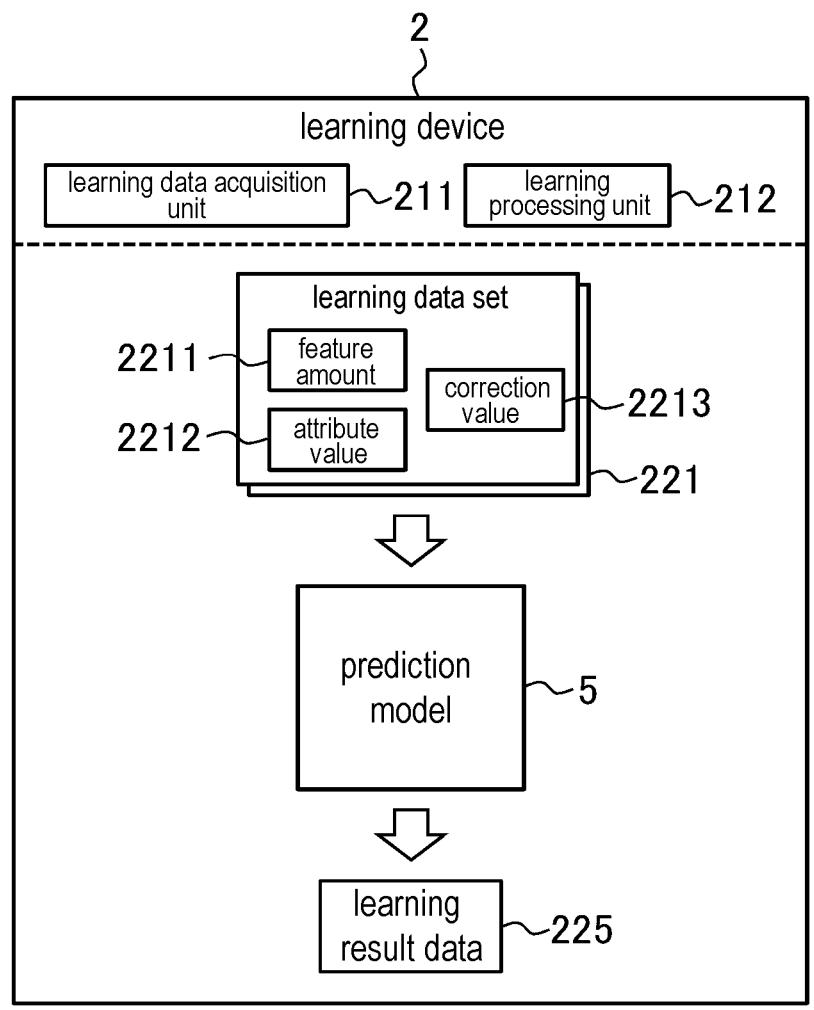
FIG. 8 schematically illustrates an example of the software configuration of the learning device according to the embodiment.

Next, an example of the software configuration of the learning device 2 according to the present embodiment will be described using FIG. 8. FIG. 8 schematically illustrates an example of the software configuration of the learning device 2 according to the present embodiment.

The control unit 21 of the learning device 2 deploys the learning program 82 stored in the storage unit 22 into the RAM. Further, the control unit 21 interprets and executes the learning program 82 deployed in the RAM by the CPU, and controls each component, on the basis of the series of instructions included in the learning program 82. As a result, as shown in FIG. 8, the learning device 2 according to the present embodiment is configured as a computer which includes a learning data acquisition unit 211 and a learning processing unit 212 as a software module. That is, in this embodiment, each software module is realized by the control unit 21 (CPU).

The learning data acquisition unit 211 acquires the learning data used for machine learning of the prediction model 5. In the present embodiment, since the prediction model 5 is made up of a decision tree, the learning data acquisition unit 211 acquires the learning data set 221 formed of a combination of training data (input data) and teacher data (correct answer data). In the present embodiment, the prediction model 5 is configured to output a correction value 63 for the reference value 60 of the command value, with respect to the input of the feature amount 61 of the workpiece 40 and the attribute value 62 of the environment for manufacturing the product 41. Therefore, the learning data set 221 is formed by a combination of a feature amount 2211 of the workpiece, an attribute value 2212 of the environment for manufacturing the product, and a correction value 2213 adapted thereto.

The learning processing unit 212 establishes the learned prediction model 5, by performing the machine learning using the acquired learning data set 221. Upon inputting the feature amount 2211 and the attribute value 2212, the learning processing unit 212 establishes a decision tree to reach the leaf node of the class corresponding to the correction value 2213 associated with the input feature amount 2211 and the attribute value 2212. As a result, the learning processing unit 212 can establish the learned prediction model 5. Further, the learning processing unit 212 stores information indicating the configuration of the established learned prediction model 5 and each branching condition in the storage unit 22 as learning result data 225.

<Others>

Each software module of the control device 1 and the learning device 2 will be described in detail in an operation example to be described below. The present embodiment describes an example in which each software module of the control device 1 and the learning device 2 is realized by a general-purpose CPU. However, some or all of the aforementioned software modules may be realized by one or more dedicated processors. Further, with respect to the software configurations of each of the control device 1 and the learning device 2, omissions, replacements, and additions of software modules may be appropriately performed according to the embodiment.

§ 3 Operation Example

[Control Device]

Figure 9A:
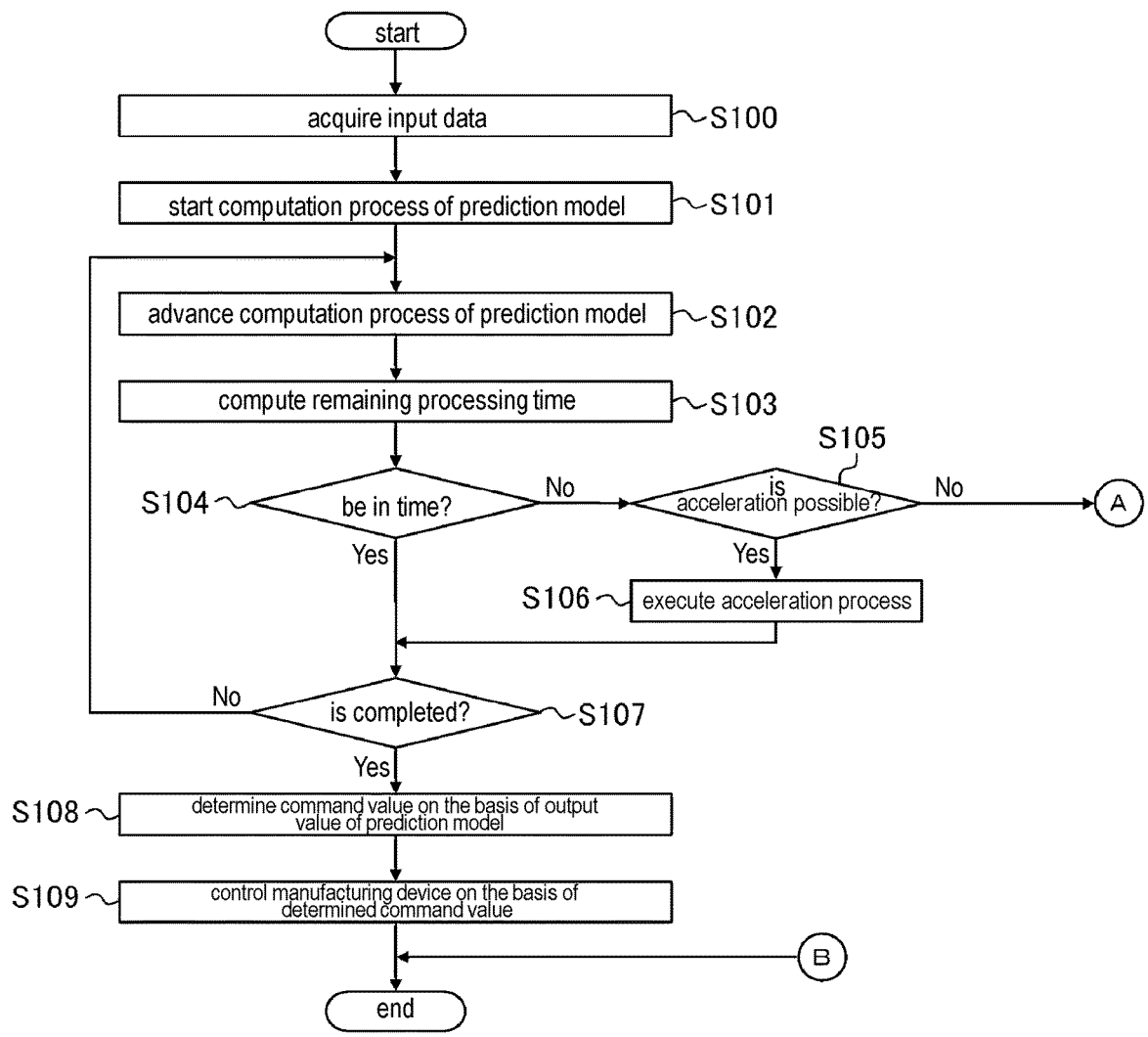
FIG. 9A illustrates an example of a processing procedure of the control device according to the embodiment.
Figure 9B:
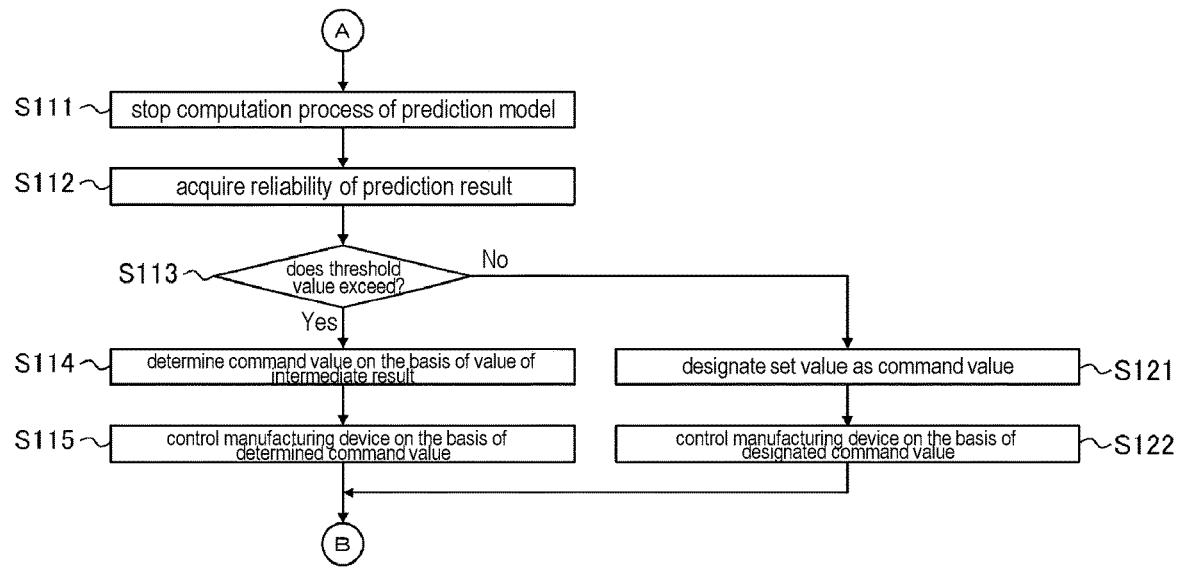
FIG. 9B illustrates an example of a processing procedure of the control device according to the embodiment.

Next, an operation example of the control device 1 will be described using FIGS. 9A and 9B. FIGS. 9A and 9B are flowcharts illustrating an example of the processing procedure of the control device 1. The processing procedure described below is an example of the "control method" of the present invention. However, the processing procedure described below is merely an example, and each processing may be changed as much as possible. Further, in the processing procedure to be described below, steps can be omitted, replaced, and added as appropriate according to the embodiment.

(Step S100)

In step S100, the control unit 11 operates as the data acquisition unit 111, and acquires input data for the prediction model 5.

In the present embodiment, as mentioned above, the prediction model 5 is established to predict the command value adapted to manufacturing of the product 41, with respect to the input of the feature amount 61 of the workpiece 40 and the attribute value 62 of the environment for manufacturing the product 41. Therefore, the control unit 11 acquires, as the input data to the prediction model 5, the feature amount 61 of the workpiece 40 and the attribute value 62 of the environment for manufacturing the product 41.

The feature amount 61 of the workpiece 40 is not particularly limited as long as it can show some features of the workpiece, and may be appropriately selected according to the embodiment. Further, the attribute value 62 of the environment for manufacturing the product 41 is not particularly limited as long as it can show some attributes related to the environment in which the manufacturing device 3 operates, and may be appropriately selected according to the embodiment.

In the present embodiment, the manufacturing device 3 is a press machine. As mentioned above, in the manufacturing device 3, if the pressing time is insufficient, or if the servo motor is not driven until the upper mold 32 reaches the bottom dead center, the quality of the product 41 acquired is degraded. Therefore, it is preferable that the feature amount 61 of the workpiece 40 and the attribute value 62 of the environment for manufacturing the product 41 are related to the process of the press forming in the manufacturing device 3, respectively.

Therefore, as the feature amount 61 of the workpiece 40, for example, hardness, size, material, weight, heat or the like of the workpiece 40 may be selected. Further, as the attribute value 62 of the environment for manufacturing the product 41, for example, the temperature, the humidity, the degree of deterioration of the device (for example, the number of years, the number of times of processing, etc.), vibration or the like around the manufacturing device 3 may be selected. At this time, the feature amount 61 of the workpiece 40 may directly indicate the features of the workpiece 40 or may indirectly indicate the features of the workpiece 40. That is, when the feature amount 61 of the workpiece 40 is related to the hardness of the workpiece 40, the feature amount 61 of the workpiece 40 may express the hardness (rigidity) itself of the workpiece 40 by a numerical value, a class, or the like. Further, the feature amount 61 of the workpiece 40 may indicate a secondary index (e.g., the load applied to the workpiece, torque made to act at the time of measurement, etc.) obtained when measuring the hardness (rigidity) of the workpiece 40, by a numerical value, class, or the like. The same applies to the attribute value 62.

Further, the method for acquiring each of the feature amount 61 of the workpiece 40 and the attribute value 62 of the environment for manufacturing the product 41 may be appropriately selected according to the embodiment. For example, various sensors configured to be able to measure each of the feature amount 61 (e.g., hardness, etc.) of the workpiece 40 and the attribute value 62 of the environmental (e.g., a temperature, etc.) may be disposed in the manufacturing device 3. Known sensors may be appropriately used for the various sensors, depending on the types of the feature amount 61 and the attribute value 62 to be measured. In this case, the control unit 11 can acquire each of the feature amount 61 of the workpiece 40 and the attribute value 62 of the environment for manufacturing the product 41, from various sensors disposed in the manufacturing device 3. When the feature amount 61 of the workpiece 40 and the attribute value 62 of the environment for manufacturing the product 41 are acquired, the control unit 11 advances the processing to the next step S101.

(Step S101)

In step S101, the control unit 11 operates as the prediction computation unit 112, and starts the computation processing of the prediction model 5 established to predict a command value to the manufacturing device 3 that manufactures the product 41 from the workpiece 40, the command value being adapted to manufacturing of the product 41 by the manufacturing device 3.

In the present embodiment, the prediction model 5 is made up of a decision tree, and the learning result data 225 includes information indicating the configuration of the prediction model 5 and the branching condition of each route. Therefore, the control unit 11 sets the prediction model 5 by referring to the learning result data 225. By this setting process, the control unit 11 enters a state in which the search processing for the decision tree (prediction model 5) can be started. Thus, when the computation processing of the prediction model 5 is started, the control unit 11 advances the processing to the next step S102.

(Step S102)

In step S102, the control unit 11 operates as the prediction computation unit 112 and advances the computation processing of the prediction model 5. In the present embodiment, since the prediction model 5 is made up of a decision tree, the computation processing of the prediction model 5 is a search processing that follows a link from the root node to the leaf node of the decision tree. Therefore, the control unit 11 advances the search processing of the decision tree as the computation processing of the prediction model 5.

Specifically, when the search processing is not executed even once, the control unit 11 determines whether input data (the feature amount 61 and the attribute value 62) satisfy the branching condition set in the root node. Further, based on this determination result, the control unit 11 advances the search to the corresponding node at the second layer (in the example of FIG. 7A, the intermediate node N1 or the intermediate node N2).

Similarly, when the search processing is executed n times (n is a natural number of 1 or more), the search advances to the intermediate node of the $(n+1)^{th}$ layer. In this case, the control unit 11 determines whether the input condition satisfies the branching condition set in the corresponding intermediate node in the $(n+1)^{th}$ layer. Further, the control unit 11 advances the search to the corresponding node at a $(n+2)^{th}$ layer on the basis of this determination result.

When the search processing of the decision tree is advanced in this way, the control unit 11 advances the processing to the next step S103. The degree of advancing the search processing in one process of step S102 may be appropriately determined according to the embodiment. When the degree of advancing the search processing is a depth k (k is a natural number of 1 or more), the control unit 11 executes the determination process of the branching condition k times, and then advances the processing to the next step S103.

(Step S103)

In step S103, the control unit 11 operates as a remaining processing time computation unit 113, and computes the remaining processing time until the computation processing of the prediction model 5 is completed. The method for computing the remaining processing time may be appropriately determined according to the embodiment. In the present embodiment, the control unit 11 checks the progress state of the computation processing to calculate the remaining processing amount of the computation processing, and computes the remaining processing time on the basis of the computed remaining processing amount. Specifically, the control unit 11 computes the remaining processing time by the following computation of (Formula 1).

[Formula 1]

"(Estimated) remaining processing time"="processing time up to now"×("remaining processing amount")/("Processing time up to now") ... (Formula 1)

The "processing time up to now" is the time from the start of the computation processing of the prediction model 5 by step S101 to the execution of step S103. The control unit 11 can obtain the value of the processing time up to now, by measuring the time from the start of the computation processing of the prediction model 5 by step S101, for example, using a timer (not shown) or the like.

The "processing amount up to now" is a processing amount from the start of the computation processing of the prediction model 5 by step S101 to the execution of the present step S103. The control unit 11 can obtain the value of the processing amount up to now, for example, by measuring the processing amount of the CPU after the computation processing of the prediction model 5 is started by step S101. Further, in the present embodiment, since the prediction model 5 is made up of the decision tree, the control unit 11 can obtain the value of the processing amount up to now, also by measuring the number of times for executing the determination process of the branching condition in the search processing of the decision tree.

The "remaining processing amount" is a difference between an overall processing amount of the computation processing of the prediction model 5 and the processing amount up to now. The control unit 11 can obtain the value of the remaining processing amount, by subtracting the processing amount up to now from the overall processing amount of the computation processing of the prediction model 5.

The overall processing amount of the computation processing of the prediction model 5 may be appropriately estimated according to the embodiment. The overall processing amount may be estimated, on the basis of, for example, a result of simulating the computation processing of the prediction model 5, a result (an actual value) of past execution of the computation processing of the prediction model 5, or the like. In this case, the overall processing amount may be estimated depending on the execution time of the simulation or the past computation processing.

Further, in the present embodiment, the prediction model 5 is made up of a decision tree. In this case, the time required for the computation processing of the prediction model 5, that is, the search processing of the decision tree, is dependent on is the depth of the decision tree (particularly, the number of intermediate nodes passing from the root node to the leaf node). Therefore, if the depth of the decision tree is fixed, the overall processing amount of the search processing of the decision tree is hard to change from a theoretical value derived from an algorithm of the search processing of the decision tree. Therefore, the overall processing amount may be estimated, for example, on the basis of the theoretical value derived from the algorithm of the prediction model 5.

A format for expressing the aforementioned each processing amount may not be particularly limited, and may be appropriately selected according to the embodiment. Each processing amount may be expressed by, for example, a computation amount of CPU, a theoretical amount of computation processing, or the like. In the present embodiment, the theoretical amount of computation processing can be indicated by, for example, the depth of the decision tree.

As a specific example, it is assumed that the depth of the decision tree forming the prediction model 5 is 11, and the determination process of the branching conditioning is completed up to the intermediate node of the second layer (that is, the search reaches the intermediate node of the third layer). When each processing amount is expressed by the depth of the decision tree, if the depth of the decision tree is 11, since the number of search processing that reach the leaf node is 10, the value of the overall processing amount can be expressed as "10". Further, the value of the processing amount up to now can be expressed as "2". Therefore, the value of the remaining processing amount can be expressed as "10−2=8". At this time, if the processing time up to now is 0.01 seconds, the control unit 11 can compute that the remaining processing time is 0.04 (seconds), by the computation of "0.01 (seconds)×((10−2)/2)".

The expression format of the remaining processing time is not particularly limited as long as it can express the timing at which the computation processing of the prediction model 5 is completed, and may be appropriately selected according to the embodiment. The remaining processing time may be expressed by a time system (seconds) according to the international unit system, as in the aforementioned example. Further, the remaining processing time may be expressed by, for example, the number of clocks of the CPU, the takt time indicating the operation cycle of the manufacturing device 3, or the like. When computing the remaining processing time, the control unit 11 advances the processing to the next step S104.

(Step S104)

In step S104, the control unit 11 operates as a delay determination unit 114, and determines whether the determination of the command value based on the output value obtained from the prediction model 5 is made within the control timing for controlling the manufacturing operation by the manufacturing device 3, on the basis of the computed remaining processing time.

In this embodiment, the control unit 11 first computes the remaining time up to the control timing by the following Formula 2.

[Formula 2]

"Remaining time"="scheduled control time"−"current time" . . . (Formula 2)

"Scheduled control time" is the time of control timing and is determined in advance. The control unit 11 can acquire the value of the scheduled control time from, for example, information indicating a schedule for controlling the operation of the manufacturing device 3, such as the control program 81. Further, the "current time" is the time when this step S104 is executed. The control unit 11 can acquire the value of the current time using, for example, a timer (not shown). However, the computation method for the remaining time is not limited to such an example, and may be appropriately changed according to the embodiment.

Next, the control unit 11 computes the difference by subtracting the remaining processing time from the computed remaining time. This difference indicates an estimated spare time from the completion of the computation processing of the prediction model 5 to the control timing. That is, if this difference is a negative value, it indicates that the computation processing of the prediction model 5 is estimated to be completed at a time later than the control timing.

Therefore, the control unit 11 determines whether the difference obtained by subtracting the remaining processing time from the remaining time exceeds a predetermined threshold value. Further, when the acquired difference exceeds the predetermined threshold value, the control unit 11 determines that determination of the command value is made within the control timing. On the other hand, when the acquired difference is equal to or less than the predetermined threshold value, the control unit 11 determines that determination of the command value is not made within the control timing.

This predetermined threshold value may be set appropriately. The predetermined threshold value serves as a reference for determining that determination of the command value is made within the control timing. Further, the predetermined threshold value can also serve as a reference for determining whether the computation processing of the prediction model 5 is completed with a time margin with respect to the control timing. That is, the predetermined threshold value may correspond to a grace (margin) time from the completion of the computation processing of the prediction model 5 to the control of the operation of the manufacturing device 3. Therefore, the control unit 11 may determine whether the computation processing of the prediction model 5 is completed with a time margin with respect to the control timing, as the determination of whether the determination of the command value is made within the control timing.

From the above, the control unit 11 can determine whether determination of the command value is made within the control timing. When it is determined that the determination of the command value is made within the control timing, the control unit 11 advances the processing to step S107. On the other hand, when it is determined that the determination of the command value is not made within the control timing, the control unit 11 advances the processing to step S105. However, the method for determining whether the determination of the command value is made within the control timing may not be limited to such an example, and may be appropriately changed according to the embodiment.

As with the remaining processing time, the expression format of the remaining time may not be particularly limited as long as the control timing can be expressed, and may be appropriately selected according to the embodiment. The remaining time may be expressed by, for example, a time system (seconds) according to the international unit system, the number of clocks of the CPU, a takt time indicating an operation cycle of the manufacturing device 3, and the like.

(Step S105)

In step S105, the control unit 11 operates as the acceleration processing unit 115, and determines whether the computation processing of the prediction model 5 can be accelerated.

In step S106 to be described below, for example, the computation processing of the prediction model 5 is accelerated, by preferentially allocating computation resources of hardware for the computation processing of the prediction model 5. Therefore, in the present embodiment, the control unit 11 can determine whether it is possible to accelerate the computation processing of the prediction model 5, by determining whether there is room for the computation resources to be preferentially allocated to the computation processing of the prediction model 5.

When it is determined that there is room for the computation resources to be preferentially allocated to the computation processing of the prediction model 5 and the computation processing of the prediction model 5 can be accelerated, the control unit 11 advances the processing to step S106. On the other hand, when it is determined that there is no room for the computation resources to be preferentially allocated to the computation processing of the prediction model 5, and the computation processing of the prediction model 5 cannot be accelerated, the control unit 11 advances the processing to step S111. However, the method for determining whether the computation processing of the prediction model 5 is possible may not be limited to such an example, and may be appropriately changed according to the embodiment.

(Step S106)

In step S106, the control unit 11 operates as the acceleration processing unit 115 and accelerates the computation processing of the prediction model 5. The control unit 11 can accelerate the computation processing of the prediction model 5, for example, by preferentially allocating the computation resources of the hardware to the computation processing of the prediction model 5. The computation resources are, for example, a CPU, a memory or the like.

Figure 10:
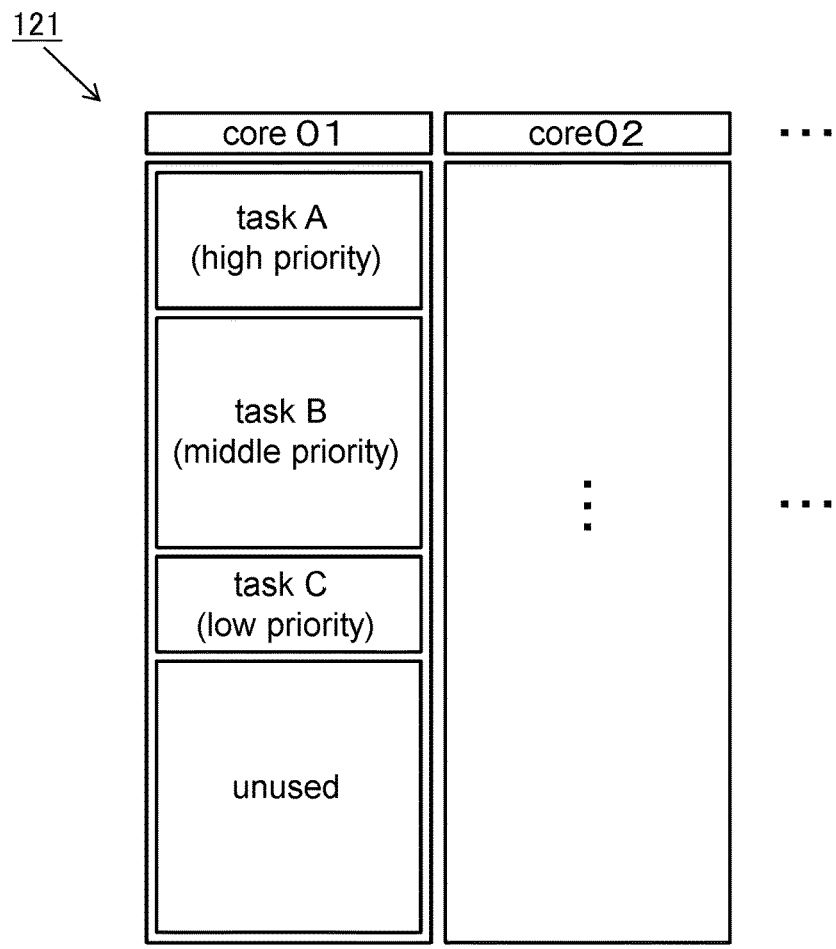
FIG. 10 schematically illustrates an example of allocation information.
Figure 11:
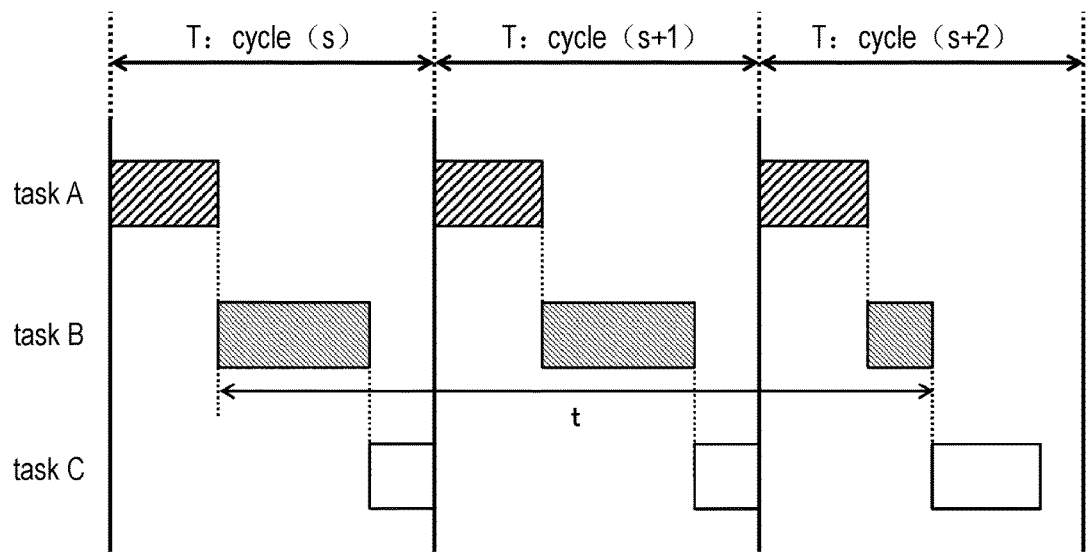
FIG. 11 is a diagram for explaining scheduling of a core.

Here, an example of a method in which the control unit 11 (CPU) executes a plurality of tasks including a computation processing of the prediction model 5 will be described, using FIGS. 10 and 11. FIG. 10 schematically illustrates an example of an allocation data 121 showing a status of task allocation to the CPU. FIG. 11 schematically illustrates an example of scheduling by which the CPU executes a task for the task allocation shown in FIG. 10.

A CPU, which is a hardware processor, is made up of one or more cores. The core is a circuit that executes the computation processing. As the number of cores increases, the CPU can execute more computation processing in parallel. Each core of the CPU executes each task by the allocated utilization rate, in order from the task with the highest priority within one cycle.

For example, in the example of FIG. 10, the CPU has at least two cores, and three tasks A to C are allocated to the core 01. Task A is set to have the highest priority, task B is set to have the second highest priority, and task C is set to have the lowest priority. Further, in the example of FIG. 10, the vertical length of each of the tasks A to C indicates the utilization rate of the core. Therefore, in core 01, the utilization rate of task B is set to the highest, the utilization rate of task A is set to the second highest, and the utilization rate of task C is set to the lowest. The unused portion is a free space. Tasks A to C can be allocated to the free space (the utilization rate is increased), or other tasks can be allocated to the free space.

In this case, as shown in FIG. 11, the core 01 first executes the task A with the highest priority within each cycle by an amount corresponding to the utilization rate. Next, the core 01 executes the task B having the second highest priority by an amount corresponding to the utilization rate. Further, the core 01 executes the task C with the lowest priority by an amount according to the utilization rate.

At the end time of each cycle, each core does not abort or execute the task of low priority, but starts processing of the next cycle, that is, execution of the task of highest priority. Further, when the execution of each task is completed, the task disappears, and the execution of the task of the next highest priority is preferred.

In the example of FIG. 11, it is assumed that the execution of task C is aborted at the first cycle (s) and the second cycle (s+1), and the execution of task B is completed at time t in the middle of the third cycle (s+2). Therefore, at the third cycle, after the execution of the task B is completed, the core 01 executes the task C by the amount corresponding to the utilization rate. However, the method by which each core executes a task is not limited to such an example, and may be appropriately determined according to the embodiment.

As mentioned above, when the degree of executing a task is determined on the basis of the priority and the utilization rate, by increasing at least one of the priorities and the utilization rate of the task, the computation resources for the task can be preferentially allocated to accelerate the task execution. In the present embodiment, the control unit 11 can accelerate the computation processing of the prediction model 5, for example, by the following four methods.

(1) First Method

Figure 12A:
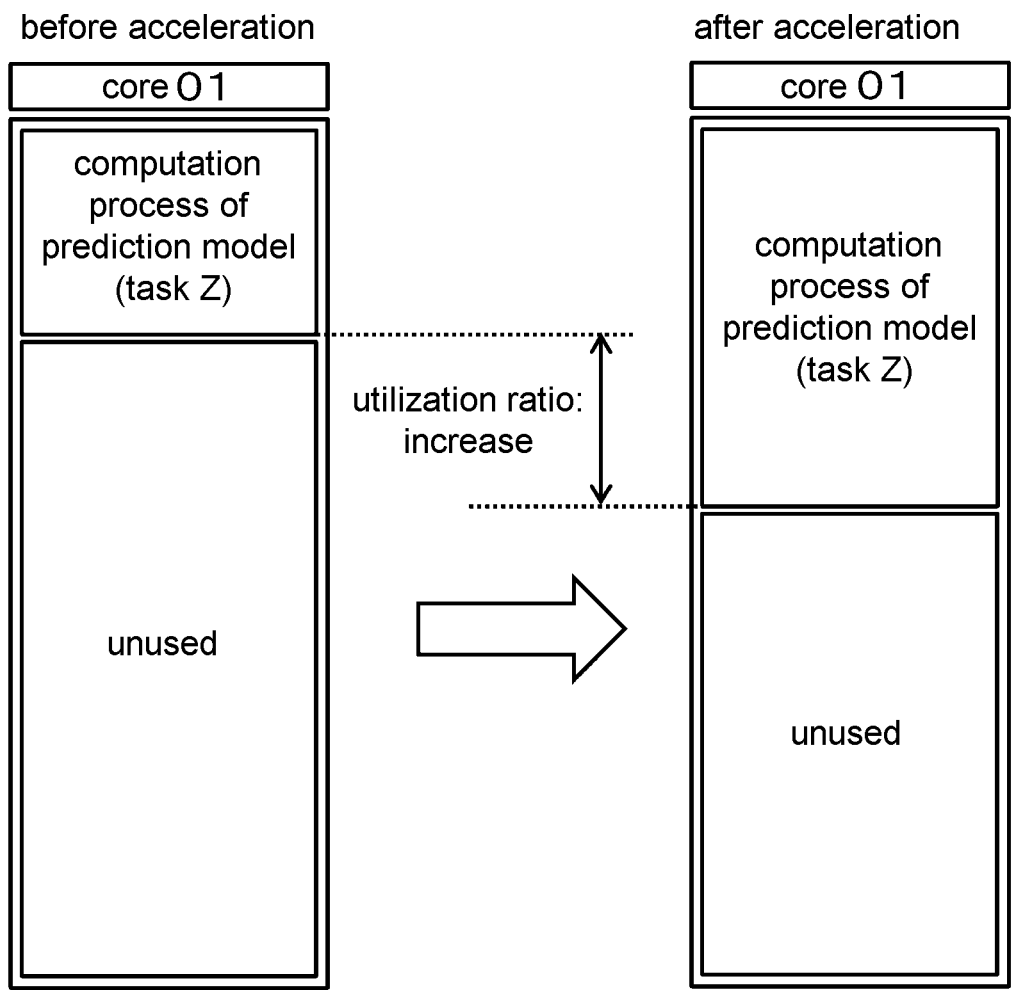
FIG. 12A schematically illustrates an example of an acceleration processing.

First, the first method for accelerating the computation processing of the prediction model 5 will be described using FIG. 12A. FIG. 12A schematically illustrates the first method for accelerating the computation processing of the prediction model 5.

In the first method, it is assumed that the CPU, which is a hardware processor, is made up of one or plurality of cores. In this first method, for example, at least one core is allocated to the computation processing of the prediction model 5 by the aforementioned step S101 and the like. In this state, the control unit 11 accelerates the computation processing of the prediction model 5 by increasing the utilization rate of the allocated core with respect to the computation processing of the prediction model 5.

In the example of FIG. 12A, the computation processing of the prediction model 5 (hereinafter, also referred to as "task Z") is allocated to the core 01. The control unit 11 refers to the allocation data 121 and checks whether there is a free space in the core 01 to which the task Z is allocated. If there is no free space in the core 01, the control unit 11 determines that it is not possible to accelerate the computation processing by the first method. On the other hand, when there is a free space in the core 01, the control unit 11 determines that it is possible to accelerate the computation processing by the first method, and allocates at least a part of the free space to the task Z, thereby enhancing the utilization rate of the core 01 for the task Z. The amount of free space allocated to the task Z may be set appropriately according to the embodiment. Since this makes it possible to increase the computation resources allocated to the computation processing of the prediction model 5, the control unit 11 can accelerate the computation processing of the prediction model 5 (that is, increase the execution amount of the task Z).

(2) Second Method

Figure 12B:
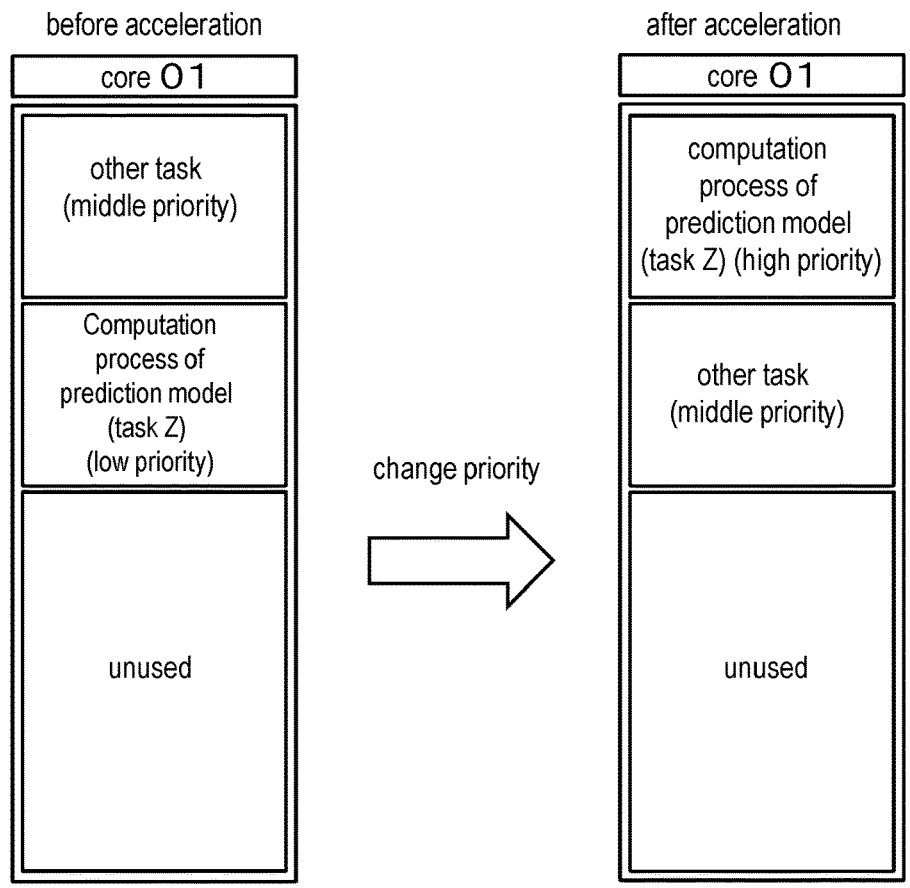
FIG. 12B schematically illustrates an example of the acceleration processing.

Next, a second method for accelerating the computation processing of the prediction model 5 will be described using FIG. 12B. FIG. 12B schematically illustrates the second method for accelerating the computation processing of the prediction model 5.

In the second method, like the first method, it is assumed that the CPU, which is a hardware processor, is made up of one or a plurality of cores. In the second method, for example, at least one core is allocated to the computation processing of the prediction model 5 by the aforementioned step S101 or the like. In this state, the control unit 11 accelerates the computation processing of the prediction model 5, by increasing the priority of the computation processing of the prediction model 5 in the allocated core.

In the example of FIG. 12B, the computation processing (task Z) of the prediction model 5 is allocated to the core 01. In addition to the task Z, other tasks are allocated to the core 01. In this case, the control unit 11 refers to the allocation data 121, and checks the priority of each task. Further, the control unit 11 checks whether the priority of the task Z can be made higher than those of the other tasks.

When there is no task in which the task Z has the highest priority, the priority is higher than the task Z, and the priority can be made lower than the task Z, it is difficult to make the priority of the task Z higher than other tasks. Therefore, in such a case, the control unit 11 determines that it is not possible to accelerate the computation processing by the second method.

On the other hand, when there is room for making the priority of the task Z higher than the other tasks, the control unit 11 determines that the computation processing can be accelerated by the second method, and makes the priority of the task Z higher than other tasks. In the example of FIG. 12B, the priority of task Z is "low" and the priority of other tasks is "medium" in the state before acceleration. That is, the priority of task Z is set to be lower than the priorities of other tasks. Therefore, the control unit 11 may change the priority of the task Z to be higher than the priorities of other tasks.

In the example of FIG. 12B, the control unit 11 makes the priority of the tsk Z higher than other tasks, by changing the priority of the task Z from "low" to "high", without changing the priorities of other tasks. However, the method for increasing the priority of the task Z is not limited to such an example. The control unit 11 may change the priority of the task Z to be lower, with changing the priority of task Z or without changing the priority of task Z. By these methods, the control unit 11 can make the priority of the task Z relatively higher than those of other tasks. As a result, since the computation processing of the prediction model 5 can be prioritized, the control unit 11 can accelerate the computation processing of the prediction model 5.

(3) Third Method

Figure 12C:
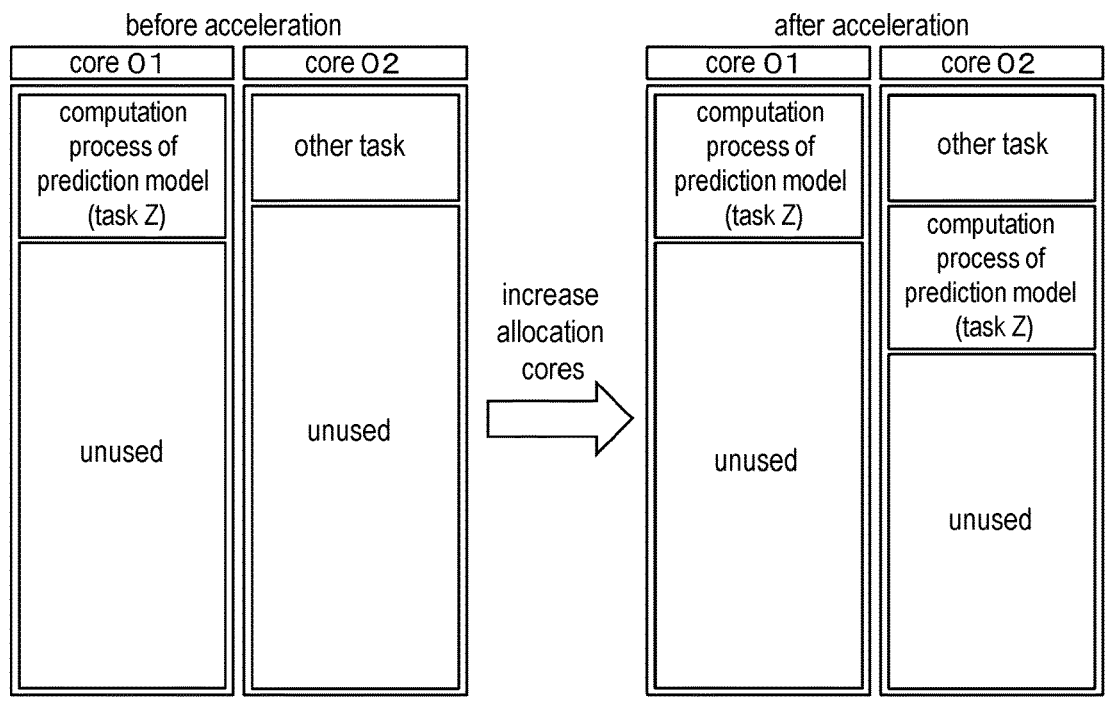
FIG. 12C schematically illustrates an example of the acceleration processing.

Next, a third method for accelerating the computation processing of the prediction model 5 will be described using FIG. 12C. FIG. 12C schematically illustrates a third method for accelerating the computation processing of the prediction model 5.

In the third method, it is assumed that the CPU, which is a hardware processor, is made up of a plurality of cores. In the third method, for example, the first core among the plurality of cores is allocated to the computation processing of the prediction model 5, by the aforementioned step S101 or the like. On the other hand, it is assumed that before the acceleration processing of step S106, there is a second core among the plurality of cores that is not allocated to the computation processing of the prediction model 5. In the example of FIG. 12C, the core 01 is an example of the first core, and the core 02 is an example of the second core.

In this state, the control unit 11 further allocates the second core, which is not allocated to the computation processing of the prediction model 5, to the computation processing of the prediction model 5, thereby accelerating the computation processing of the prediction model 5. That is, the control unit 11 accelerates the computation processing of the prediction model 5, by increasing the number of cores allocated to the computation processing of the prediction model 5. The number of the first cores and the second cores may be one or more, respectively.

In the example of FIG. 12C, the computation processing (task Z) of the prediction model 5 is allocated to the core 01. On the other hand, the computation processing of the prediction model 5 is not allocated but other tasks are allocated to the core 02. A free space exists in the core 02. The control unit 11 refers to the allocation data 121, and checks whether there is a second core to which the task Z is not allocated and which has a free space.

If such a second core does not exist, the control unit 11 determines that the computation processing cannot be accelerated by the third method. On the other hand, when the second core exists, the control unit 11 determines that the computation processing can be accelerated by the third method, and allocates at least a part of the free space of the second core to task Z. The amount of free space allocated to the task Z may be appropriately determined according to the embodiment. As a result, since the computation resource allocated to the computation processing of the prediction model 5 can be increased, the control unit 11 can accelerate the computation processing of the prediction model 5.

(4) Fourth Method

Figure 12D:
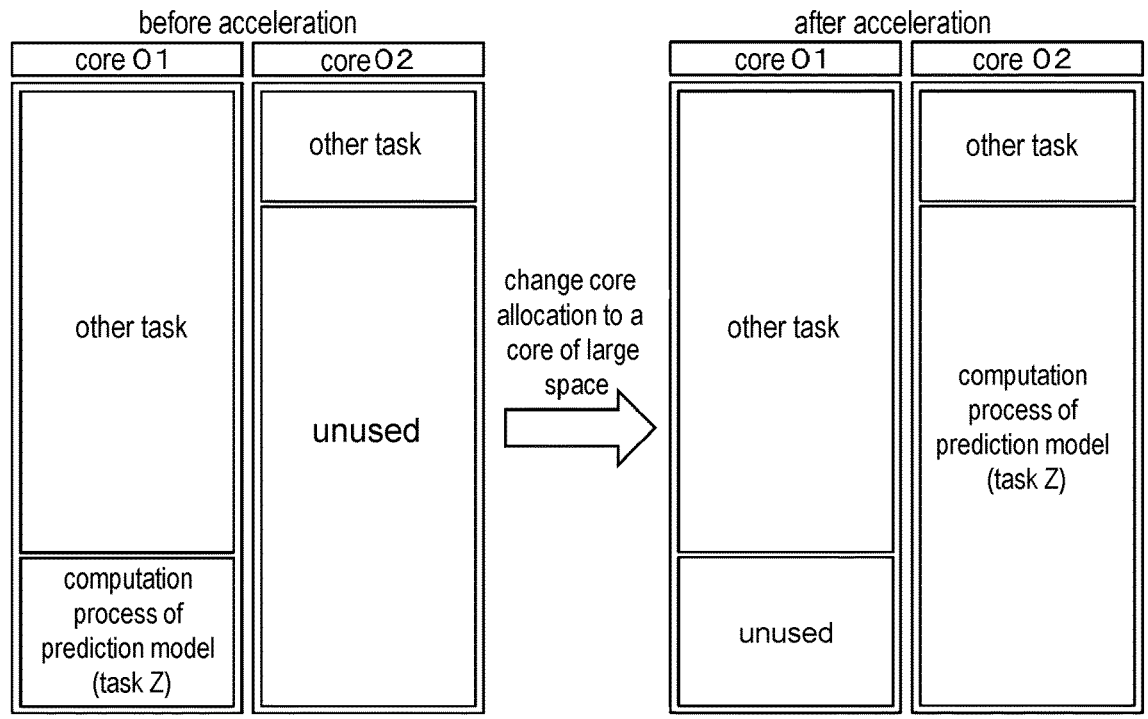
FIG. 12D schematically illustrates an example of the acceleration processing.

Next, a fourth method for accelerating the computation processing of the prediction model 5 will be described using FIG. 12D. FIG. 12D schematically illustrates the fourth method for accelerating the computation processing of the prediction model 5.

In the fourth method, it is assumed that the CPU, which is a hardware processor, is made up of a plurality of cores. In the fourth method, the third core among the plurality of cores is allocated to the computation processing of the prediction model 5, for example, by the aforementioned step S101 or the like. On the other hand, it is assumed that before the acceleration processing of step S106, the plurality of cores includes a fourth core that is not allocated to the computation processing of the prediction model 5 and has a free capacity greater than the utilization rate allocated to the computation processing in the third core. In the example of FIG. 12D, the core 01 is an example of the third core, and the core 02 is an example of the fourth core.

In this state, the control unit 11 replaces the allocation of the prediction model 5 for the computation processing with the fourth core from the third core, and allocates the utilization rate, which is larger than the utilization rate allocated to the computation processing in the third core, to the computation processing in the fourth core, thereby accelerating the computation processing of the prediction model 5. That is, the control unit 11 changes the core allocated to the task Z, from the original core to which the task Z is allocated, to a new core which can allocate a higher utilization rate to the task Z, thereby accelerating the computation processing of the prediction model 5. The number of the third cores and the number of the fourth cores may each be one or more.

In the example of FIG. 12D, the computation processing (task Z) of the prediction model 5 is allocated to the core 01. On the other hand, the computation processing of the prediction model 5 is not allocated to the core 02, but other tasks are assigned. The core 02 has a free space (an "unused" spaced in the figure) larger than the utilization rate allocated to the task Z in the core 01. The control unit 11 refers to the allocation data 121, and checks whether there is a fourth core to which the task Z is not allocated and which has a free space larger than the utilization rate of the task Z in the core 01.

When there is no such fourth core, the control unit 11 determines that acceleration of the computation processing by the fourth method is not possible. On the other hand, when the fourth core exists, the control unit 11 determines that the computation processing can be accelerated by the fourth method. Further, the control unit 11 allocates at least a partial space of the free area of the fourth core, which is larger than the utilization rate allocated to task Z in core 01, to the task Z. At this time, as shown in FIG. 12D, the control unit 11 may delete the allocation of the task Z in the core 01 (third core). As a result, since the computation resources allocated to the computation processing of the prediction model 5 can be increased, the control unit 11 can accelerate the computation processing of the prediction model 5.

In the example of FIG. 12D, tasks other than task Z are allocated to other spaces of core 01. Therefore, in the core 01, there is no room for increasing the utilization rate of the task Z by the first method. The control unit 11 may adopt the fourth method, when there is no room for adopting the first method in the third core as mentioned above. On the other hand, in the third core, when there is room for increasing the utilization rate of the task Z, the control unit 11 may adopt the first method.

(5) Others

By adopting at least one of the first to fourth methods described above, the control unit 11 can accelerate the computation processing of the prediction model 5. When the computation processing of the prediction model 5 is accelerated by at least one of the first to fourth methods, the control unit 11 advances the processing to the next step S107.

However, the method for accelerating the computation processing of the prediction model 5 may not be limited to these examples. For example, it is assumed that the virtual memory of the control device 1 includes a cache memory (not shown), a RAM of the control unit 11, and a storage unit 12. In addition, it is assumed that the cache memory, the RAM of the control unit 11, and the storage unit 12 are closer to the CPU in this order. In this case, the control unit 11 may control the allocation of the memory such that the virtual memory allocated to the computation processing of the prediction model 5 has a higher specific gravity of the memory closer to the CPU. As a result, since the control unit 11 can increase the access speed to the data used for the computation processing, it is possible to accelerate the computation processing of the prediction model 5.

In step S105, when none of the first to fourth methods can be adopted, the control unit 11 may determine that the computation processing of the prediction model 5 cannot be accelerated. On the other hand, when at least one of the first to fourth methods can be adopted, the control unit 11 may determine that the computation processing of the prediction model 5 can be accelerated.

(Step S107)

Returning to FIG. 9, in step S107, the control unit 11 operates as the prediction computation unit 112, and determines whether the computation processing of the prediction model 5 is completed. A method for determining whether the computation processing of the prediction model 5 is completed may be appropriately determined depending on the type of model adopted in the prediction model 5.

In the present embodiment, since the prediction model 5 is made up of a decision tree, the control unit 11 determines whether the search processing in step S102 reaches any leaf node of the decision tree. When the search processing reaches any of the leaf nodes, the control unit 11 determines that the computation processing of the prediction model 5 is completed, and advances the processing to the next step S108. On the other hand, when the search processing does not reach any leaf node, that is, when the search processing advances to only the intermediate node, the control unit 11 determines that the computation processing of the prediction model 5 is not completed, and repeats the process from step S102.

In step S104, when it is determined that the determination of the command value is made within the control timing, the control unit 11 continues the process computation of the prediction model 5 until completion, by repeating the series of steps S102 to S104 and S107. Accordingly, the control unit 11 can acquire the output value from the prediction model 5 as the final result of the computation processing. In the present embodiment, when the search processing of the decision tree is completed, the control unit 11 can acquire the first value associated with the leaf node reached in the search processing, as the output value that is the final result.

Further, after accelerating the computation processing of the prediction model 5 by step S106, when it is determined that the computation processing of the prediction model 5 is not completed, the control unit 11 executes steps S102 to S104 again. When the acceleration in step S106 is sufficient, in step S104 executed again, it is determined that determination of the command value is made within the control timing. As a result, the control unit 11 can continue the computation processing of the prediction model 5 until completion.

On the other hand, when the acceleration in step S106 is insufficient, it is determined again that determination of the command value is not made within the control timing in step S104 executed again. In this case, in step S105, as long as it is determined that acceleration is possible, the control unit 11 can accelerate the computation processing of the prediction model 5, by executing step S106 until it is determined that the determination of the command value is made within the control timing. Further, the control unit 11 can complete the computation processing of the prediction model 5 so that determination of the command value is made within the control timing, by sufficiently accelerating the computation processing of the prediction model 5.

In contrast, if it is determined in step S104 that determination of the command value is not made within the control timing, and it is determined in step S105 that the computation processing of the prediction model 5 cannot be accelerated, the control unit 11 advances the processing to step S111, as mentioned above. The same also applies to the case where it is determined again that the determination of the command value is not made within the control timing in step S104 executed again after step S106, and it is determined that the computation processing of the prediction model 5 cannot be accelerated in subsequent step S105. Therefore, the control unit 11 omits a series of processes from step S107 to step S109 to be described below, as described below, stops the computation processing of the prediction model 5, and controls the operation of the manufacturing device 3, using the result in the middle of computation or by a method other than the prediction control.

(Step S108)

In step S108, the control unit 11 operates as the operation control unit 116, and determines the command value to the manufacturing device 3 on the basis of the output value acquired from the prediction model 5. The method for determining the command value may be appropriately determined, depending on the format of the output value of the prediction model 5.

In the present embodiment, as mentioned above, a correction value 63 for the reference value 60 of the command value, as an output value corresponding to the prediction result of the command value adapted to manufacturing of the product 41, is associated with each leaf node of the decision tree that constitutes the prediction model 5. Therefore, when the search processing of the decision tree is completed, the control unit 11 can acquire the correction value 63 associated with the reached leaf node, as the output value from the prediction model 5. Therefore, the control unit 11 can determine the command value to the manufacturing device 3, by correcting the reference value 60 with the acquired correction value 63. When determining the command value, the control unit 11 advances the processing to the next step S109.

(Step S109)

In step S109, the control unit 11 operates as the operation control unit 116, and controls the operation of the manufacturing device 3 on the basis of the determined command value. The method for controlling the operation of the manufacturing device 3 on the basis of the command value may be appropriately selected depending on the format of the command value.

In the present embodiment, the manufacturing device 3 is a press machine, and includes a servo driver 31 that drives the upper mold 32. Therefore, the command value may indicate the number of pulses that defines the drive amount of the servo motor. In this case, the control unit 11 transmits the command value to the servo driver 31 of the manufacturing device 3 via an external interface 14. The servo driver 31 drives the servo motor on the basis of the command value received from the control device 1. Accordingly, the control unit 11 can control the operation of the manufacturing device 3 on the basis of the determined command value. When the operation of the manufacturing device 3 is controlled, the control unit 11 ends the process relating to this operation example.

The format of the command value may not be limited to such an example. The command value may be expressed by, for example, an intermediate index such as the drive amount of the servo motor and the moving amount of the upper mold 32. In this case, the control unit 11 may directly transmit the command value expressed by the intermediate index to the manufacturing device 3, or may convert the command value expressed by the intermediate index into a directly usable format such as the number of pulses and may transmit the converted command value to the manufacturing device 3.

(Step S111)

As mentioned above, step S111 is executed when it is determined that the determination of the command value is not made within the control timing, and it is determined that the computation processing of the prediction model 5 cannot be accelerated. That is, step S111 is executed when the computation processing of the prediction model 5 cannot be accelerated such that the determination of the command value is made within the control timing. In step S111, the control unit 11 operates as the prediction computation unit 112, and stops the computation processing of the prediction model 5. Further, the control unit 11 acquires the value of the intermediate result of the computation processing of the prediction model 5.

Figure 13:
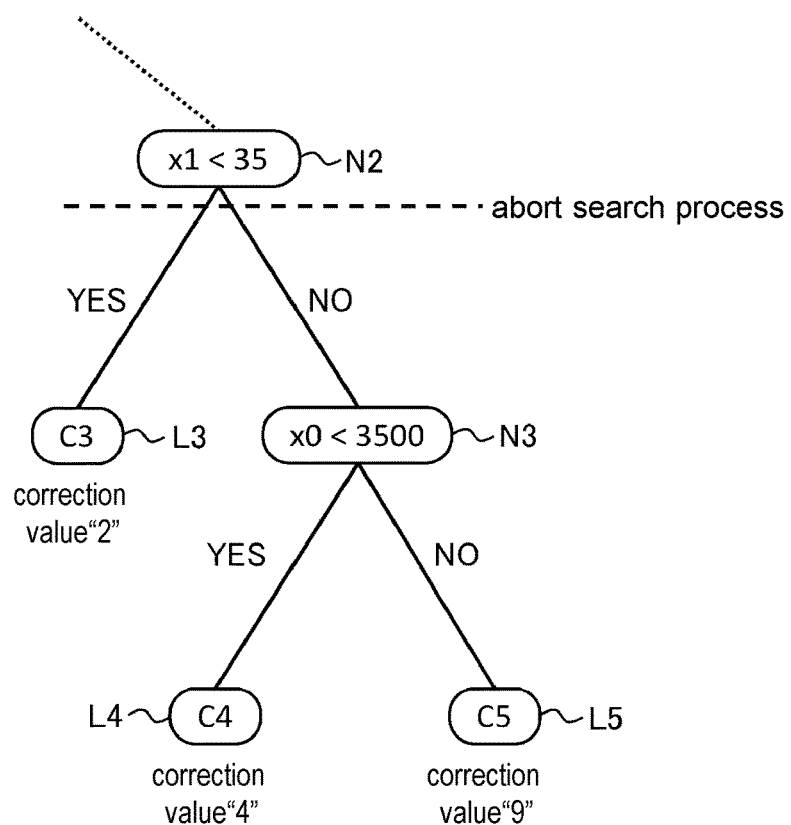
FIG. 13 is a diagram for explaining a method for computing a value of an intermediate result.

Here, the value of the intermediate result of the computation processing obtained from the decision tree forming the prediction model 5 will be described using FIG. 13. FIG. 13 is a diagram for explaining a method for computing the value of the intermediate result from the decision tree. Specifically, FIG. 13 exemplifies a scene in which, in the decision tree shown in FIG. 7A, the computation processing is stopped (the search processing is terminated) when the intermediate node N2 is reached.

When the search processing is executed until completion, the search processing normally reaches any leaf node belonging to the intermediate node reached when stopping the search processing. The leaf node belonging to the intermediate node is a leaf node to which the search processing may reach, when the search processing is continued from the intermediate node. That is, the leaf node belonging to the intermediate node is a leaf node which is lower than the intermediate node and is reachable from the intermediate node via a link.

Therefore, in the present embodiment, the value of the intermediate result of the computation processing is determined on the basis of the first value associated with the leaf node belonging to the intermediate node reached when stopping the search processing. That is, when the search processing of the decision tree is stopped, the control unit 11 acquires the second value determined on the basis of the first value associated with the leaf node belonging to the intermediate node reached when stopping the search processing, as the value of the intermediate result.

In the example of FIG. 13, three leaf nodes L3 to L5 belong to the intermediate node N2. Therefore, the value (that is, the second value) of the intermediate result of the search processing, which is stopped when the intermediate node N2 is reached, is determined on the basis of the first value associated with the leaf nodes L3 to L5. It the present embodiment, the first value is the correction value 63 for the reference value 60 of the command value. Therefore, the second value determined on the basis of the first value is also a correction value for the reference value 60 of the command value.

The method for determining the second value on the basis of the first value may be appropriately selected according to the embodiment. For example, the second value may be an average value of the first values associated with all leaf nodes belonging to the intermediate node reached when stopping the search processing. In the case of FIG. 13, the correction value "2" is associated with the leaf node L3, the correction value "4" is associated with the leaf node L4, and the correction value "9" is associated with the leaf node L5. Therefore, in the case of FIG. 13, when this method is adopted, the second value is computed as the correction value "5".

Further, for example, the second value may be an intermediate value of the first values associated with all the leaf nodes belonging to the intermediate nodes reached when stopping the search processing. In the case of FIG. 13, when this method is adopted, the second value is computed as the correction value "4".

Also, for example, as the second value, the first value, which is closest to the average value of the first values associated with all leaf nodes belonging to the intermediate node reached when stopping the search processing, may be adopted. In the case of FIG. 13, the average value of all the first values is "5", and the first value closest to this average value "5" is "4". Therefore, in the case of FIG. 13, when this method is adopted, the second value is computed as the correction value "4".

Also, for example, as the second value, the value of highest frequency among the first values associated with all leaf nodes belonging to the intermediate node reached when stopping the search processing may be adopted. In the example of FIG. 13, it is assumed that the correction value associated with the leaf node L5 is "2". In this case, the value of highest frequency among the first values associated with all the leaf nodes L3 to L5 belonging to the intermediate node N2 is "2". Therefore, in this case, when this method is adopted, the second value is computed as the correction value "2".

The control unit 11 appropriately acquires the second value computed by any of the aforementioned methods as the value of the intermediate result. For example, the control unit 11 may acquire the value of the intermediate result, by computing the second value from the first value by any one of the aforementioned methods, at the time when the search processing for the decision tree (the computation processing of the prediction model 5) is stopped.

However, this acquisition method incurs a computation cost because the computation for computing the second value is performed. Therefore, the second value may be associated with the intermediate node. In this case, when the search processing of the decision tree is stopped, the control unit 11 may acquire the second value associated with the intermediate node reached at the time of stopping the search processing, as the value of the intermediate result. As a result, it is possible to suppress the computation cost of acquiring the value of the intermediate result.

In this case, the control device 1 may hold the intermediate result information in a table format or the like indicating the correspondence between the intermediate node and the second value, in the storage unit 12. This intermediate result information may be included in the learning result data 225. The control unit 11 may acquire the second value associated with the intermediate node reached at the time of stopping the search processing, by referring to this intermediate result information, when the search processing of the decision tree is stopped.

When the computation processing of the prediction model 5 is stopped as mentioned above, the control unit 11 advances the processing to the next step S112.

(Step S112)

Returning to FIG. 9B, in step S112, the control unit 11 operates as the operation control unit 116, and acquires the reliability indicating the degree of whether the value of the intermediate result is reliable as the result of the prediction. This reliability may be computed as appropriate according to the embodiment.

For example, the reliability may be determined on the basis of the progress of the computation processing of the prediction model 5. In the present embodiment, since the prediction model 5 is made up of a decision tree, the progress of the computation processing may be expressed by a ratio of a depth of the tree reached by the search processing to a maximum value of the depth of the decision tree. In this case, it is evaluated that the progress of the computation processing is advanced as the search processing reaches a deeper node, and thus, the reliability of the value of the intermediate result is set higher.

Further, a state in which the search processing reaches the intermediate node indicates that candidates of the correction value can be narrowed, from the correction value associated with all the leaf nodes included in the decision tree to the correction value associated with the leaf node belonging to the reached intermediate node. Therefore, the progress of the computation processing may be expressed by the ratio of the number of leaf nodes belonging to the intermediate node reached by the search processing to the number of all leaf nodes included in the decision tree. In this case, it is evaluated that the progress of the computation processing advances, as the number of leaf nodes belonging to the intermediate node reached by the search processing is small, and thus, the reliability of the value of the intermediate result is set higher.

However, the method for expressing the progress of the computation processing may not be limited to such an example, and may be appropriately selected according to the embodiment. For example, it is assumed that the prediction model 5 is made up of a plurality of decision trees, and the computation processing of the prediction model 5 is a process that performs a search processing for each decision tree, and acquires the output value of the highest frequency among the output values obtained from each decision tree that completed the search processing. In such a case, the progress of the computation processing may be expressed by the ratio of the number of decision trees for which the search processing is completed to the total number of decision trees constituting the prediction model 5.

When determining the reliability on the basis of the progress, the correspondence between the reliability and the progress may be appropriately set such that the higher the progress is, the higher the reliability is, and the lower the progress is, the lower the reliability is. For example, the reliability may be set to be proportional to the progress.

Further, for example, the reliability may be determined on the basis of the result of testing or simulating the operation of the manufacturing device 3, using the value of the intermediate result. As an example, in the test or the simulation, an achievement level (for example, an error from the bottom dead center) for the quality standard may be computed, and the reliability may be evaluated by the computed achievement level. In this case, the higher the achievement level is, the higher the reliability is set, and the lower the achievement level is, the lower the reliability is set.

The control unit 11 appropriately acquires the reliability obtained by any of the aforementioned methods. When the reliability is determined on the basis of the progress, the control unit 11 may acquire the reliability, by computing the progress from the intermediate result of the computation processing and by computing the reliability on the basis of the computed progress. Further, the reliability may be associated with the intermediate node, like the second value. In this case, the control unit 11 can acquire the reliability associated with the intermediate node reached at the time of stopping the search processing, by the same method as the second value, when stopping the search processing of the decision tree. When the reliability for the value of the intermediate result is acquired, the control unit 11 advances the processing to the next step S113.

(Step S113)

In step S113, the control unit 11 operates as the operation control unit 116, and determines whether the reliability acquired in step S112 exceeds the designated threshold value. The threshold value may be appropriately designated according to the embodiment. The threshold value may be specified, for example, by a user who uses the control device 1 or may be designated in advance in the control program 81. When it is determined that the acquired reliability exceeds the threshold value, the control unit 11 advances the processing to the next step S114. On the other hand, when it is determined that the acquired reliability does not exceed the threshold value, the control unit 11 omits steps S114 and S115, and advances the processing to step S121.

(Step S114)

In step S114, the control unit 11 operates as the operation control unit 116, and determines the command value to the manufacturing device 3 on the basis of the value of the intermediate result. As mentioned above, the value of the intermediate result (second value) according to the present embodiment is a correction value for the reference value 60 of the command value. Therefore, in step S114, the control unit 11 can determine the command value to the manufacturing device 3, by correcting the reference value 60 with the correction value acquired as the value of the intermediate result, as in step S108. When the command value is determined, the control unit 11 advances the processing to the next step S115.

In the present embodiment, the control unit 11 acquires the value of the intermediate result of the computation processing in step S111. However, the timing of acquiring the value of the intermediate result of the computation processing may not be limited to such an example. The timing for acquiring the value of the intermediate result of the computation processing may be appropriately determined according to the embodiment before this step S114. For example, the control unit 11 may acquire the value of the intermediate result of the computation processing after determining in step S113 that the reliability exceeds the threshold value.

(Step S115)

In step S115, the control unit 11 operates as the operation control unit 116, and controls the operation of the manufacturing device 3 on the basis of the command value determined in step S114. This step S115 is the same as the aforementioned step S109. When the operation of the manufacturing device 3 is controlled, the control unit 11 ends the process according to this operation example.

(Step S121)

In step S121, the control unit 11 operates as the operation control unit 116, and specifies a set value given in advance as the command value.

The set value given in advance may be appropriately determined according to the embodiment. The set value given in advance may be, for example, the reference value 60 of the command value or the past command value. When a series of processes for controlling the operation of the manufacturing device 3 according to the present operation example is repeatedly executed, the past command value may be, for example, a previous value when the operation of the manufacturing device 3 is controlled immediately before.

The previous value may be a command value when the operation of the manufacturing device 3 is controlled immediately before, irrespective of the input data acquired in step S100. In this case, the control unit 11 specifies the same command value twice immediately before and this time.

Further, the previous value may be a command value when the operation of the manufacturing device 3 is controlled immediately before, in a case where the input values acquired in step S100 are the same or similar. The control unit 11 can determine whether the input data are similar to each other in the current case and the past case, by determining whether the difference between the input data at the time of the past control and the input data obtained this time is equal to or less than a threshold value.

The set value given in advance may be held in the storage unit 12, the RAM of the control unit 11, or the like. The control unit 11 can specify the command value to the manufacturing device 3, by referring to the set value held in the storage unit 12, the RAM, or the like. When the command value is specified, the control unit 11 advances the processing to the next step S122.

(Step S122)

In step S122, the control unit 11 operates as the operation control unit 116, and controls the operation of the manufacturing device 3 on the basis of the command value designated by step S121. This step S122 is the same as step S109. When the operation of the manufacturing device 3 is controlled, the control unit 11 ends the process according to this operation example.

(After end)

As mentioned above, the control unit 11 ends the series of processes for controlling the operation of the manufacturing device 3 according to this operation example. The control unit 11 can continuously control the operation of the manufacturing device 3 by repeatedly executing the series of processes.

[Learning Device]

Figure 14:
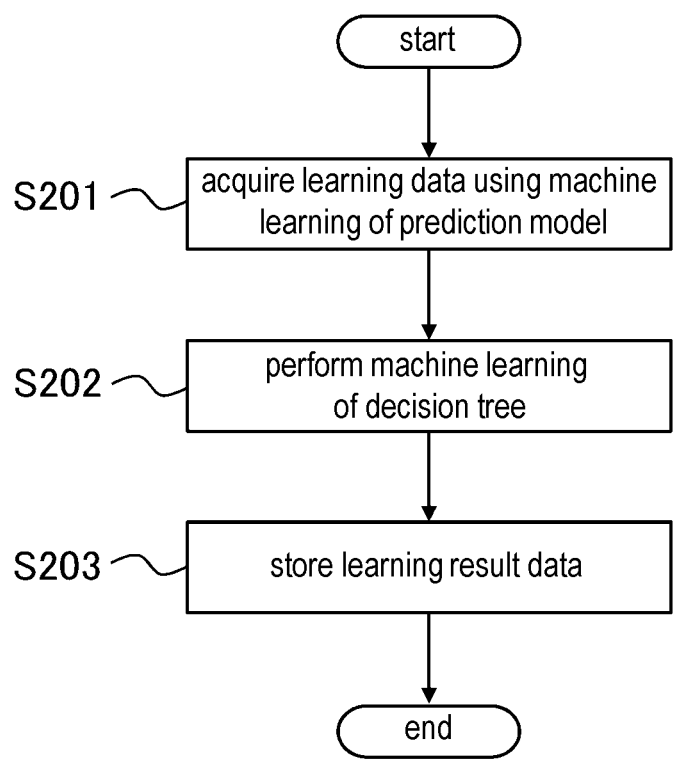
FIG. 14 illustrates an example of a processing procedure of the learning device according to the embodiment.

Next, an operation example of the learning device 2 will be described using FIG. 14. FIG. 14 is a flowchart showing an example of the processing procedure of the learning device 2. The processing procedure regarding the machine learning of the prediction model 5 described below is an example of a learning method performed by a computer. However, the processing procedure described below is merely an example, and each process may be changed as much as possible. Further, in the processing procedure described below, steps can be omitted, replaced, and added as appropriate according to the embodiment.

(Step S201)

In step S201, the control unit 21 operates as the learning data acquisition unit 211, and acquires learning data used for machine learning of the prediction model 5. The format of the learning data may be appropriately determined depending on the type of the prediction model 5.

In the present embodiment, the prediction model 5 is made up of a decision tree. Further, the decision tree is established to output a correction value 63 for the reference value 60 of the command value, in response to the input of the feature amount 61 of the workpiece 40 and the attribute value 62 of the environment for manufacturing the product 41. Therefore, the control unit 21 acquires the learning data set 221 that is configured by a combination of the feature amount 2211 of the workpiece, the attribute value 2212 of the environment for manufacturing the product, and the correction value 2213 adapted thereto.

The learning data set 221 may be appropriately generated depending on the embodiment. For example, the feature amount 2211 of the workpiece and the attribute value 2212 of the environment for manufacturing the product are acquired under various conditions. A known sensor may be used to acquire the feature amount 2211 and the attribute value 2212. For example, when the temperature is acquired as the attribute value 2212, a temperature sensor may be used. Further, a correction value 2213 for obtaining an appropriate command value under this condition is combined with the obtained feature amount 2211 and attribute value 2212. Therefore, the learning data set 221 can be generated.

The learning device 2 may generate the learning data set 221. In this case, the control unit 21 may generate the learning data set 221 depending on the manipulation of the input device 24 by the operator. Further, the control unit 21 may automatically generate the learning data set 221 by the processing of the learning program 82. By executing this generation processing, the control unit 21 can acquire the learning data set 221 in step S201.

Further, the learning data set 221 may be generated by an information processing device other than the learning device 2. In another information processing device, the learning data set 221 may be manually generated by an operator, or may be automatically generated by processing of a program. In this case, in this step S201, the control unit 21 can acquire the learning data set 221 generated by another information processing device via the network, the storage medium 92, or the like.

The number of learning data sets 221 acquired in this step S201 may be appropriately determined according to the embodiment, and may be appropriately determined, for example, to the extent that the machine learning of the decision trees can be performed. Thus, when the learning data set 221 is acquired, the control unit 21 advances the processing to the next step S202.

(Step S202)

In step S202, the control unit 21 operates as the learning processing unit 212, and performs machine learning using the acquired learning data set 221 to establish the learned prediction model 5.

In the present embodiment, when the feature amount 2211 and the attribute value 2212 are input, the control unit 21 establishes a searchable decision tree which reaches the leaf node of the class corresponding to the correction value 2213 associated with the input feature amount 2211 and the attribute value 2212. A CLS (Concept Learning System), ID3 (Iterative Dichotomiser 3), C4.5, or the like may be used for the learning method for the decision tree. Accordingly, the control unit 21 can establish the learned prediction model 5.

(Step S203)

In step S203, the control unit 21 operates as the learning processing unit 212, and stores information, which indicates the configuration and each branching condition of the decision tree (learned prediction model 5) established by the machine learning, in the storage unit 22 as the learning result data 225. As a result, the control unit 21 ends the learning process of the prediction model 5 according to this operation example.

The control unit 21 may transmit the created learning result data 225 to the control device 1 after the processing of step S203 is completed. Further, the control unit 21 may periodically update the learning result data 225, by regularly executing the learning process of steps 5201 to S203. Further, the control unit 21 may periodically update the learning result data 225 held by the control device 1, by transmitting the created learning result data 225 to the control device 1 each time the learning process is executed. Further, for example, the control unit 21 may store the created learning result data 225 in a data server such as a NAS (Network Attached Storage).

In this case, the control device 1 may acquire the learning result data 225 from this data server. Further, the learning result data 225 created by the learning device 2 may be incorporated in the control device 1 in advance.

[Features]

As mentioned above, in the present embodiment, when predicting the command value to the manufacturing device 3 using the prediction model 5, the remaining processing time is computed by steps S103 and S104, and on the basis of the computed remaining processing time, it is determined whether the determination of the command value by the prediction model 5 is made within the control timing. As a result, it is possible to specify whether the computation processing related to the prediction of the command value using the prediction model 5 is made within timing for controlling the operation of the manufacturing device 3 using the predicted command value. That is, it is possible to specify whether the determination of the command value in step S108 is completed until the scheduled control time for controlling the operation of the manufacturing device 3.

In particular, the control device 1 can process a plurality of tasks including tasks other than the computation processing of the prediction model 5 (for example, FIGS. 12B to 12D). In this case, for example, due to the occurrence of an interrupt task or the like, the computation resources (hardware processor, memory, etc.) in the control device 1 are not always available under the same conditions. That is, the situation of the computation resources in the control device 1 changes from moment to moment, and the computation resources that can be used for the computation processing of the prediction model 5 may also change accordingly. Therefore, the processing time required for the computation processing of the prediction model 5 is not always constant. Therefore, on the basis of the processing time previously specified by the simulation or the like, even if it is determined that the computation processing of the prediction model 5 can be processed to be made within the control timing, the control device 1 may not always be able to complete the computation processing of the prediction model 5 to be made within the control timing of the manufacturing device 3. In contrast, in the present embodiment, the control device 1 checks the situation of the computation resources (specifically, the progress of the computation processing) at the time of executing the computation processing of the prediction model 5 in step S103, and computes the remaining processing time required for the computation processing, on the basis of this situation. As a result, even if the situation of the computation resources changes momentarily, the control device 1 can appropriately determine in step S104 whether the computation processing of the prediction model 5 is made within the control timing. Therefore, according to the present embodiment, the computation time of the prediction control of the manufacturing device 3 can be appropriately managed.

Furthermore, in the present embodiment, when it is determined that the determination of the command value is made within the control timing in step S104, the control device 1 repeats the series of processes of steps 5102 to 5104 and 5107, and then executes the processes of steps S108 and S109. As a result, the control device 1 can appropriately execute the prediction control as it is. On the other hand, when it is determined in step S104 that the determination of the command value is not made within the control timing, and it is determined in step S105 that the computation processing of the prediction model 5 cannot be accelerated, the control device 1 stops the computation processing of the prediction model 5. In this case, the control device 1 determines the command value on the basis of the value of the intermediate result of the computation processing by steps S114 and S115, and controls the operation of the manufacturing device 3 on the basis of the determined command value. Alternatively, the control device 1 designates a set value given in advance as a command value and controls the operation of the manufacturing device 3 on the basis of the designated command value, by steps S121 and S122. As a result, it is possible to prevent the process for controlling the operation of the manufacturing device 3 from being delayed because the determination of the command value by the prediction model 5 is not made within the control timing. Therefore, according to the present embodiment, the prediction control of the manufacturing device 3 can be appropriately performed.

Further, in the present embodiment, when the reliability of the value of the intermediate result is evaluated to be relatively high in step S113, the control device 1 determines the command value on the basis of the value of the intermediate result of the computation processing, and controls the operation of the manufacturing device 3 on the basis of the determined command value, by steps S114 and S115. On the other hand, when the reliability of the value of the intermediate result is evaluated to be relatively low, the control device 1 designates the set value given in advance as a command value, and controls the operation of the manufacturing device 3 on the basis of the designated command value, by the steps S121 and S122. Therefore, even when the computation processing of the prediction model 5 is not completed, the command value adapted to manufacturing of the product can be determined, on the basis of the value of the intermediate result in which reliability is higher than the threshold value. Therefore, according to the present embodiment, the operation of the manufacturing device 3 can be appropriately controlled even when the computation processing of the prediction model 5 is not completed.

Further, in the present embodiment, when it is determined in step S104 that determination of the command value is made within the control timing, the computation processing of the prediction model 5 can be accelerated by executing the processing of step S106. As a result, the control device 1 can make the determination of the command value by the prediction model 5 within the control timing. Therefore, according to the present embodiment, it is possible to reduce the possibility that the prediction control by the prediction model 5 is terminated, and to appropriately perform the prediction control.

§ 4 Modification Example

Although the embodiments of the present invention have been described in detail above, the aforementioned description is merely an example of the present invention in all respects. It goes without saying that various improvements and modifications can be made without departing from the scope of the present invention. For example, the following changes are possible. In addition, below, the same components as the aforementioned embodiments were denoted by the same referenced numerals, and the explanation of the same points as the aforementioned embodiments was omitted appropriately. The following modification examples can be combined as appropriate.

<4.1>

In the aforementioned embodiment, when it is determined in step S104 that the determination of the command value by the prediction model 5 is not made within the control timing, the control unit 11 accelerates the computation processing of the prediction model 5 by steps S105 and S106.

The processing of accelerating the computation processing of the prediction model 5 may be omitted. When the acceleration processing is omitted, the aforementioned steps S105 and S106 may be omitted, and the acceleration processing unit 115 may be omitted from the software configuration of the control device 1.

In the aforementioned embodiment, the reliability for the value of the intermediate result is acquired in step S112, and it is determined in step S113 whether the acquired reliability exceeds the threshold value. Therefore, the control unit 11 determines whether to use the value of the intermediate result of the computation processing or to use the set value given in advance to determine the command value to the manufacturing device 3. The series of processes of steps S112 and S113 may be omitted. In this case, steps S121 and S122 may be omitted.

<4.2>

In the aforementioned embodiment, the prediction model 5 is configured to output the correction value 63 for the reference value 60 of the command value, as a result of the prediction of the command value adapted to manufacturing of the product 41. However, the output format of the prediction model 5 is not limited to such an example, and may be appropriately determined according to the embodiment. For example, the prediction model 5 may be configured to output the command value itself.

<4.3>

In the aforementioned embodiment, both the feature amount 61 of the workpiece 40 and the attribute value 62 of the environment for manufacturing the product 41 are used as the input of the prediction model 5. However, the input of the prediction model 5 may not be limited to such an example. One of the feature amount 61 of the workpiece 40 and the attribute value 62 of the environment for manufacturing the product 41 may be omitted. That is, the prediction model 5 may be established to predict a command value adapted to manufacturing of the product 41 with respect to at least one of the feature amount 61 of the workpiece 40 and the attribute value 62 of the environment for manufacturing the product 41. Further, as the input of the prediction model 5, a data regarding the factors that may influence the manufacturing process of the product 41 by the manufacturing device 3, other than the feature amount 61 of the workpiece 40 and the attribute value 62 of the environment for manufacturing the product 41, may be used.

<4.4>

In the aforementioned embodiment, the prediction model 5 is made up of a decision tree. However, the configuration of the prediction model 5 is not limited to such an example, and may be appropriately selected according to the embodiment, as long as it is possible to predict the command value to the manufacturing device 3 at a time point (future time point) before the time point when the prediction process is executed, and it is possible to output the intermediate result of the computation processing. Further, as the prediction model 5, a model other than the learning model may be used.

What is claimed is:

1. A control device comprising:
a hardware processor, and
a memory which holds a program executed by the hardware processor,
wherein the hardware processor executes, on the basis of a series of instructions included in the program,
a step of starting a computation processing of a prediction model established to predict a command value to a manufacturing device which manufactures a product from a workpiece, the command value being adapted to manufacturing of the product by the manufacturing device;
a step of computing a remaining processing time until the computation processing of the prediction model is completed after starting the computation processing of the prediction model;
a step of determining whether determination of the command value based on an output value obtained from the prediction model is made within a control timing for controlling operation of the manufacturing by the manufacturing device, on the basis of the computed remaining processing time;
when it is determined that the determination of the command value is made within the control timing, by continuing the computation processing of the prediction model until completion, a step of acquiring the output value from the prediction model as a final result of the computation processing of the prediction model and determining the command value to the manufacturing device on the basis of the output value obtained from the prediction model, and controlling the operation of the manufacturing device on the basis of the determined command value; and
when it is determined that the determination of the command value is not made within the control timing, a step of stopping the computation processing of the prediction model, and determining the command value to the manufacturing device on the basis of a value of an intermediate result of the computation processing of the prediction model, and controlling the operation of the manufacturing device on the basis of the determined command value.

2. The control device according to claim 1, wherein the prediction model is made up of a decision tree,
the decision tree includes a root node, a leaf node, and an intermediate node disposed between the root node and the leaf node,
the computation processing of the prediction model is a search processing which follows a link from the root node of the decision tree toward the leaf node,
the leaf node is associated with a first value, when the search processing of the decision tree is completed, the hardware processor acquires the first value associated with the leaf node reached in the search processing, as the output value, and when the search processing of the decision tree is stopped, the hardware processor acquires a second value determined on the basis of the first value associated with the leaf node belonging to the intermediate node reached at a time of stopping the search processing, as the value of the intermediate result.

3. The control device according to claim 2, wherein the second value is an average value of a plurality of the first values associated with all leaf nodes belonging to the intermediate node reached at the time of stopping the search processing.

4. The control device according to claim 3, wherein the second value is associated with the intermediate node, and when the search processing of the decision tree is stopped, the hardware processor acquires the second value associated with the intermediate node reached at the time of stopping the search processing, as the value of the intermediate result.

5. The control device according to claim 3, wherein, when the computation processing of the prediction model is stopped, the hardware processor acquires reliability indicating a degree of whether the value of the intermediate result is reliable as a result of prediction, the hardware processor determines whether the acquired reliability exceeds a designated threshold value, when it is determined that the reliability exceeds the threshold value, the hardware processor determines a command value to the manufacturing device on the basis of the value of the intermediate result, and controls the operation of the manufacturing device on the basis of the determined command value, and when it is determined that the reliability does not exceed the threshold value, the hardware processor omits the processing of determining the command value to the manufacturing device on the basis of the value of the intermediate result, designates a set value given in advance as the command value, and controls the operation of the manufacturing device on the basis of the designated command value.

6. The control device according to claim 2, wherein the second value is associated with the intermediate node, and when the search processing of the decision tree is stopped, the hardware processor acquires the second value associated with the intermediate node reached at the time of stopping the search processing, as the value of the intermediate result.

7. The control device according to claim 6, wherein, when the computation processing of the prediction model is stopped, the hardware processor acquires reliability indicating a degree of whether the value of the intermediate result is reliable as a result of prediction, the hardware processor determines whether the acquired reliability exceeds a designated threshold value, when it is determined that the reliability exceeds the threshold value, the hardware processor determines a command value to the manufacturing device on the basis of the value of the intermediate result, and controls the operation of the manufacturing device on the basis of the determined command value, and when it is determined that the reliability does not exceed the threshold value, the hardware processor omits the processing of determining the command value to the manufacturing device on the basis of the value of the intermediate result, designates a set value given in advance as the command value, and controls the operation of the manufacturing device on the basis of the designated command value.

8. The control device according to claim 2, wherein, when the computation processing of the prediction model is stopped, the hardware processor acquires reliability indicating a degree of whether the value of the intermediate result is reliable as a result of prediction, the hardware processor determines whether the acquired reliability exceeds a designated threshold value, when it is determined that the reliability exceeds the threshold value, the hardware processor determines a command value to the manufacturing device on the basis of the value of the intermediate result, and controls the operation of the manufacturing device on the basis of the determined command value, and when it is determined that the reliability does not exceed the threshold value, the hardware processor omits the processing of determining the command value to the manufacturing device on the basis of the value of the intermediate result, designates a set value given in advance as the command value, and controls the operation of the manufacturing device on the basis of the designated command value.

9. The control device according to claim 1, wherein, when the computation processing of the prediction model is stopped, the hardware processor acquires reliability indicating a degree of whether the value of the intermediate result is reliable as a result of prediction, the hardware processor determines whether the acquired reliability exceeds a designated threshold value, when it is determined that the reliability exceeds the threshold value, the hardware processor determines a command value to the manufacturing device on the basis of the value of the intermediate result, and controls the operation of the manufacturing device on the basis of the determined command value, and when it is determined that the reliability does not exceed the threshold value, the hardware processor omits the processing of determining the command value to the manufacturing device on the basis of the value of the intermediate result, designates a set value given in advance as the command value, and controls the operation of the manufacturing device on the basis of the designated command value.

10. The control device according to claim 9, wherein the reliability is determined on the basis of progress of the computation processing of the prediction model.

11. The control device according to claim 1, wherein when it is determined that the determination of the command value is not made within the control timing, the hardware processor further executes a step of accelerating the computation processing of the prediction model, after executing the step of accelerating the computation processing of the prediction model, the hardware processor executes a step of computing the remaining processing time, and a step of determining whether the determination of the command value is made within the control timing again, and when it is determined again that the determination of the command value is not made within the control timing, the hardware processor stops the computation processing of the prediction model, and determines the command value to the manufacturing device on the basis of the value of the intermediate result of the computation processing of the prediction model.

12. The control device according to claim 11, wherein the hardware processor determines whether the acceleration of the computation processing of the prediction model is possible, and when it is determined that the acceleration of the computation processing of the prediction model is not possible, the hardware processor stops the computation processing of the prediction model, and determines the command value to the manufacturing device on the basis of the value of the intermediate result of the computation processing of the prediction model.

13. The control device according to claim 11, wherein the hardware processor includes one or a plurality of cores, at least one core is allocated to the computation processing of the prediction model, and the hardware processor accelerates the computation processing of the prediction model by increasing a utilization rate of the allocated core with respect to the computation processing of the prediction model.

14. The control device according to claim 11, wherein the hardware processor includes one or a plurality of cores, at least one core is allocated to the computation processing of the prediction model, and the hardware processor accelerates the computation processing of the prediction model by increasing a priority of the computation processing of the prediction model in the allocated core.

15. The control device according to claim 11, wherein the hardware processor includes a plurality of cores, a first core among the plurality of cores is allocated to the computation processing of the prediction model, and the hardware processor further allocates a second core among the plurality of cores, which is not allocated to the computation processing of the prediction model, to the computation processing of the prediction model to thereby accelerate the computation processing of the prediction model.

16. The control device according to claim 11, wherein the hardware processor includes a plurality of cores, a third core among the plurality of cores is allocated to the computation processing of the prediction model, the plurality of cores includes a fourth core which is not allocated to the computation processing of the prediction model and which has a free space larger than the utilization rate allocated to the computation processing of the prediction model in the third core, and the hardware processor replaces allocation of the prediction model for the computation processing with the fourth core from the third core, and allocates a utilization rate, which is larger than the utilization rate allocated to the computation processing of the prediction model in the third core, to the computation processing of the prediction model in the fourth core, thereby accelerating the computation processing of the prediction model.

17. The control device according to claim 1, wherein the prediction model is configured to output a correction value for a reference value of the command value, as the output value corresponding to a result of prediction of the command value adapted to manufacturing of the product.

18. The control device according to claim 1, wherein the prediction model is established to predict the command value adapted to manufacturing of the product with respect to an input of at least one of a feature amount of the workpiece and an attribute value of environment for manufacturing the product.

19. A control method in which a computer executes:

a step of starting a computation processing of a prediction model established to predict a command value to a manufacturing device which manufactures a product from a workpiece, the command value being adapted to manufacturing of the product by the manufacturing device;

a step of computing a remaining processing time until the computation processing of the prediction model is completed after starting the computation processing of the prediction model;

a step of determining whether determination of the command value based on an output value obtained from the prediction model is made within a control timing for controlling operation of the manufacturing by the manufacturing device, on the basis of the computed remaining processing time;

when it is determined that the determination of the command value is made within the control timing, by continuing the computation processing of the prediction model until completion, a step of acquiring the output value from the prediction model as a final result of the computation processing of the prediction model and determining the command value to the manufacturing device on the basis of the output value acquired from the prediction model, and controlling the operation of the manufacturing device on the basis of the determined command value; and when it is determined that the determination of the command value is not made within the control timing, a step of stopping the computation processing of the prediction model, and determining the command value to the manufacturing device on the basis of a value of an intermediate result of the computation processing of the prediction model, and controlling the operation of the manufacturing device on the basis of the determined command value.

20. A non-transitory computer-readable recording medium comprising a control program which causes a computer to execute:

a step of starting a computation processing of a prediction model established to predict a command value to a manufacturing device which manufactures a product from a workpiece, the command value being adapted to manufacturing of the product by the manufacturing device;

a step of computing a remaining processing time until the computation processing of the prediction model is completed after starting the computation processing of the prediction model;

a step of determining whether determination of the command value based on an output value obtained from the prediction model is made within a control timing for controlling operation of the manufacturing by the manufacturing device, on the basis of the computed remaining processing time;

when it is determined that the determination of the command value is made within the control timing, by continuing the computation processing of the prediction model until completion, a step of acquiring the output value from the prediction model as a final result of the computation processing of the prediction model and determining the command value to the manufacturing device on the basis of the output value acquired from the prediction model, and controlling the operation of the manufacturing device on the basis of the determined command value; and when it is determined that the determination of the command value is not made within the control timing, a step of stopping the computation processing of the prediction model, and determining the command value to the manufacturing device on the basis of a value of an intermediate result of the computation processing of the prediction model, and controlling the operation of the manufacturing device on the basis of the determined command value.

* * * * *